United States Patent
Nix et al.

(10) Patent No.: US 10,346,888 B2
(45) Date of Patent: Jul. 9, 2019

(54) SYSTEMS AND METHODS TO OBTAIN PASSENGER FEEDBACK IN RESPONSE TO AUTONOMOUS VEHICLE DRIVING EVENTS

(71) Applicant: Uber Technologies, Inc., San Francisco, CA (US)

(72) Inventors: Molly Castle Nix, San Francisco, CA (US); Sean Chin, Pittsburgh, PA (US); Dennis Zhao, Pittsburgh, PA (US); Daniel Hertz, New York, NY (US)

(73) Assignee: Uber Technologies, Inc., San Francisco, CA (US)

( * ) Notice: Subject to any disclaimer, the term of this patent is extended or adjusted under 35 U.S.C. 154(b) by 57 days.

(21) Appl. No.: 15/625,145

(22) Filed: Jun. 16, 2017

(65) Prior Publication Data

US 2018/0365740 A1 Dec. 20, 2018

(51) Int. Cl.
| | |
|---|---|
| *B60W 50/00* | (2006.01) |
| *B60W 50/08* | (2012.01) |
| *G06Q 30/00* | (2012.01) |
| *G06Q 10/00* | (2012.01) |
| *G07C 5/00* | (2006.01) |

(Continued)

(52) U.S. Cl.
CPC ......... *G06Q 30/0282* (2013.01); *B60W 50/08* (2013.01); *G06Q 10/0639* (2013.01); *G07C 5/085* (2013.01); *G07C 2205/02* (2013.01)

(58) Field of Classification Search
CPC ...... G06Q 30/00; G06Q 30/0282; G07C 5/00; G07C 5/085; G08G 1/00; G08G 1/0967; B60W 40/00; B60W 40/08; B60W 40/09; B60W 40/10; G01C 21/00; G01C 21/36; G01C 21/3691; G01C 21/3697; G06K 9/00845; G06K 28/02
See application file for complete search history.

(56) References Cited

U.S. PATENT DOCUMENTS 9,466,161 B2 * 10/2016 Ricci .................. H04W 4/21
9,940,848 B1 * 4/2018 Hsu-Hoffman ...... G09B 19/167
(Continued)

FOREIGN PATENT DOCUMENTS

| WO | WO 2016/109540 | 7/2016 |
| WO | WO 2016/183525 | 11/2016 |
| WO | WO 2018/139993 | 8/2018 |

OTHER PUBLICATIONS

International Search Report and Written Opinion for PCT/US2018/037750, dated Sep. 24, 2018, 12 pages.

*Primary Examiner* — Yonel Beaulieu
(74) *Attorney, Agent, or Firm* — Dority & Manning, P.A.

(57) ABSTRACT

The present disclosure provides systems and methods to obtain autonomous vehicle passenger feedback. In particular, the systems and methods of the present disclosure can detect an occurrence of a driving event performed by an autonomous vehicle and, in response, provide an interactive user interface that enables a passenger of the autonomous vehicle to enter passenger feedback regarding the occurrence of the driving event. Thus, the systems and methods of the present disclosure can actively prompt passenger feedback in response to a particular instance of a specific type of driving event, thereby enabling improved collection of information about autonomous vehicle ride quality relative to specific types of driving events.

24 Claims, 7 Drawing Sheets

(51) Int. Cl.
   *G06Q 30/02* (2012.01)
   *G07C 5/08* (2006.01)
   *G06Q 10/06* (2012.01)

(56) References Cited

U.S. PATENT DOCUMENTS

| | | | |
|---|---|---|---|
| 2008/0319602 A1* | 12/2008 | McClellan | G07C 5/008 |
| | | | 701/31.4 |
| 2014/0309849 A1* | 10/2014 | Ricci | B60Q 1/00 |
| | | | 701/33.4 |
| 2015/0175067 A1* | 6/2015 | Keaveny | B60Q 9/00 |
| | | | 340/439 |
| 2015/0178998 A1 | 6/2015 | Attard et al. | |
| 2016/0039426 A1* | 2/2016 | Ricci | H04W 4/21 |
| | | | 701/1 |
| 2016/0197783 A1* | 7/2016 | Hort | H04L 69/18 |
| | | | 709/222 |
| 2017/0097243 A1* | 4/2017 | Ricci | H04W 4/21 |
| 2017/0109947 A1 | 4/2017 | Prokhorov | |
| 2017/0132924 A1* | 5/2017 | Tanaka | G08G 1/0967 |
| 2018/0292824 A1* | 10/2018 | Kazemi | G05D 1/0088 |
| 2018/0292830 A1* | 10/2018 | Kazemi | G05D 1/0088 |

* cited by examiner

SYSTEMS AND METHODS TO OBTAIN PASSENGER FEEDBACK IN RESPONSE TO AUTONOMOUS VEHICLE DRIVING EVENTS

FIELD

The present disclosure relates generally to autonomous vehicles. More particularly, the present disclosure relates to systems and methods to obtain passenger feedback in response to autonomous vehicle driving events.

BACKGROUND

An autonomous vehicle is a vehicle that is capable of sensing its environment and navigating with minimal or no human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path through such surrounding environment.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method to obtain autonomous vehicle passenger feedback. The method includes detecting, by a computing system that includes one or more computing devices, an occurrence of a driving event performed by an autonomous vehicle. The method includes, in response to detecting the occurrence of the driving event, providing, by the computing system, an interactive user interface that enables a passenger of the autonomous vehicle to enter passenger feedback regarding the occurrence of the driving event performed by the autonomous vehicle. The method includes receiving, by the computing system, the passenger feedback entered by the passenger of the autonomous vehicle via the interactive user interface. The method includes associating, by the computing system, the passenger feedback with one or more of: an identification of the driving event performed by the autonomous vehicle, a time at which the driving event occurred, a location at which the driving event occurred, and data collected by the autonomous vehicle during performance of the driving event.

Another example aspect of the present disclosure is directed to a computing system that includes one or more processors and one or more non-transitory computer-readable media that collectively store instructions that, when executed by the one or more processors, cause the computing system to perform operations. The operations include detecting an occurrence of a driving event performed by an autonomous vehicle. The operations include, in response to detecting the occurrence of the driving event, providing an interactive user interface that enables a passenger of the autonomous vehicle to enter passenger feedback regarding the occurrence of the driving event performed by the autonomous vehicle. The operations include receiving the passenger feedback entered by the passenger of the autonomous vehicle via the interactive user interface. The operations include associating the passenger feedback with one or more of: an identification of the driving event performed by the autonomous vehicle, a time at which the driving event occurred, a location at which the driving event occurred, and data collected by the autonomous vehicle during performance of the driving event.

Another example aspect of the present disclosure is directed to one or more non-transitory computer-readable media that collectively store instructions that, when executed by one or more processors, cause a computing system to perform operations. The operations include detecting an occurrence of a driving event performed by an autonomous vehicle. The operations include, in response to detecting the occurrence of the driving event, providing an interactive user interface that enables a passenger of the autonomous vehicle to enter passenger feedback regarding the occurrence of the driving event performed by the autonomous vehicle. The operations include receiving the passenger feedback entered by the passenger of the autonomous vehicle via the interactive user interface. The operations include associating the passenger feedback with one or more of: an identification of the driving event performed by the autonomous vehicle, a time at which the driving event occurred, a location at which the driving event occurred, and data collected by the autonomous vehicle during performance of the driving event.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
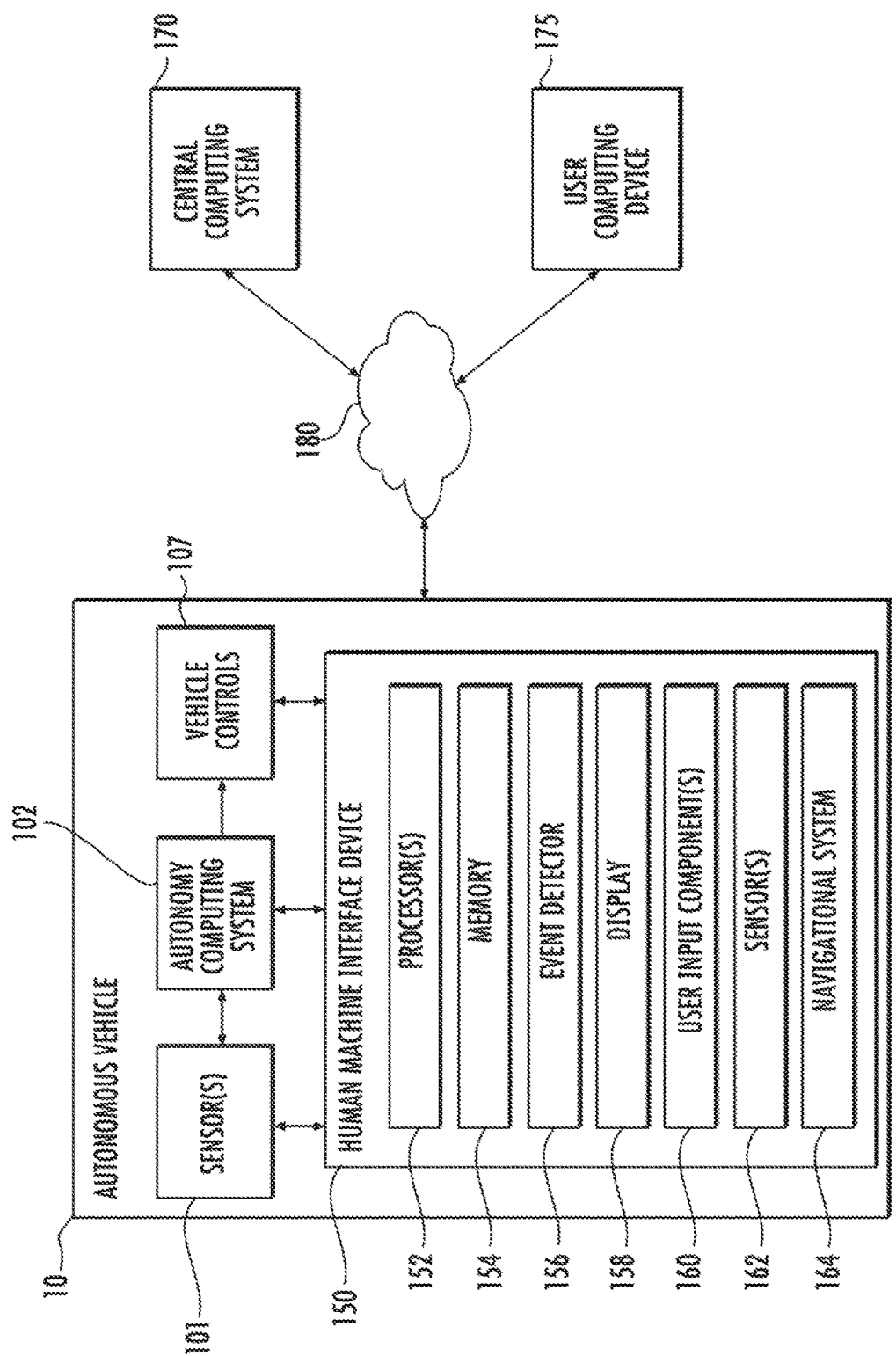
FIG. 1 depicts a block diagram of an example computing system according to example embodiments of the present disclosure.

Generally, the present disclosure is directed to systems and methods to obtain autonomous vehicle passenger feedback. In particular, the systems and methods of the present disclosure can detect an occurrence of a driving event performed by an autonomous vehicle and, in response, provide an interactive user interface that enables a passenger of the autonomous vehicle to enter passenger feedback regarding the occurrence of the driving event. Thus, the systems and methods of the present disclosure can actively prompt passenger feedback in response to a particular instance of a specific type of driving event, thereby enabling improved collection of information about autonomous vehicle ride quality relative to specific types of driving events.

More particularly, one aspect of developing, operating, and refining autonomous vehicle technology is continuously testing and improving the performance of autonomous vehicles. One metric by which the quality of motion control performed by an autonomous vehicle can be measured is the subjective response (e.g., level of satisfaction or comfort) of passengers of the autonomous vehicle when the autonomous vehicle performs certain driving events. As examples, driving events can include routine driving events such as a turn event, a lane change event, or a stopping event. As other examples, driving events can include undesirable driving events such as a high acceleration event, a high deceleration event or hard braking event, a juke motion event, a jerk motion event, a weaving motion event, an excessive speed event, an insufficient speed event, or other events that reduce the quality of ride experienced by a human passenger of the autonomous vehicle (e.g., cause the ride to be uncomfortable to a human passenger).

Thus, the subjective response of vehicle passengers to driving events performed by an autonomous vehicle can provide an indication of the quality of motion control performed by the autonomous vehicle. As such, data that describes such subjective passenger response can be useful for testing, scoring, and/or refining the operation of the autonomous vehicle.

To facilitate collection of passenger feedback descriptive of such subjective passenger response, the present disclosure provides systems and methods that utilize interactive user interfaces to enable passengers to enter passenger feedback. In particular, according to an aspect of the present disclosure, the systems and methods of the present disclosure can actively detect an occurrence of a driving event and, in response, prompt the passenger to provide feedback regarding his/her subjective response to such driving event. In such fashion, passenger feedback regarding specific instances and/or types of driving events can be collected, enabling more advanced and granular understanding and refinement of the autonomous vehicle technology relative to particular types of driving events and/or particular physical locations.

The passenger feedback collection systems of the present disclosure can include or otherwise be implemented by one or more computing devices. For example, some or all of the computing devices can be located on-board an autonomous vehicle.

Some example systems of the present disclosure include a human machine interface device that facilitates interaction between the autonomous vehicle and a human passenger. For example, the human machine interface device can be located on-board the autonomous vehicle and can facilitate interaction between the human passenger and an autonomy computing system of the autonomous vehicle that controls the motion of the autonomous vehicle.

In some implementations, the human machine interface device can include a display device (e.g., a touch-sensitive display device) and/or other input/output components that provide an interactive user interface (e.g., through which the passenger can provide passenger feedback). For example, the display device can be a rear-seat display device that is accessible by a passenger that is located in a rear seat of the autonomous vehicle.

In some implementations, in addition or alternatively to the human machine interface device, the systems and methods of the present disclosure can include or leverage a user computing device (e.g., smartphone) that is associated with the passenger. For example, in some implementations, in addition or alternatively to the display of the user interface by the human machine interface device, the interactive user interface can be provided on or accessible via a display of the user computing device. In yet further implementations, certain operations described herein can be performed by a central computing system that is remotely located to the autonomous vehicle and in communication with the autonomous vehicle over one or more wireless networks (e.g., cellular data networks).

According to an aspect, the systems of the present disclosure can detect an occurrence of a driving event performed by an autonomous vehicle. For example, the human machine interface device, the autonomy computing system, and/or other communicatively coupled devices or systems can include an event detector that continuously, near-continuously, or periodically assesses available data to detect the occurrence of a driving event performed by the autonomous vehicle. Example types of driving events are described above.

In some implementations, the systems of the present disclosure can detect an occurrence of a driving event based at least in part on turn-by-turn data associated with a navigational system included in the autonomous vehicle. For example, the navigational system can be included in the autonomy system and/or the human machine interface device. The navigational system can monitor a current location of the autonomous vehicle (e.g., via GPS or other positioning technologies) relative to a route that includes one or more navigational maneuvers. When the current location of the vehicle indicates that it has completed a navigational maneuver (e.g., a turn event), the navigational system and/or the event detector can detect that such driving event has occurred and cause a prompt for passenger feedback to occur. Thus, turn-by-turn or other navigational information can be used to detect the occurrence of a driving event.

In some implementations, the systems of the present disclosure can detect an occurrence of a driving event based at least in part on vehicle data collected by the autonomous vehicle. For example, the vehicle data can be descriptive of vehicle conditions associated with the autonomous vehicle during an autonomous driving session. In some implementations, the vehicle data can include data collected by or otherwise received from various sensors included in the autonomous vehicle. As examples, the vehicle data can include data descriptive of a speed (also referred to as velocity) and/or data descriptive of a steering angle of the autonomous vehicle. As another example, additional vehicle data can be obtained or generated that is descriptive of a lateral acceleration of the autonomous vehicle. For example, in some implementations, lateral acceleration can be a function of the speed of the vehicle and the steering angle of the vehicle. Thus, in some implementations, lateral acceleration data can be generated from speed data and steering angle data.

As further examples, the vehicle data can include various types of data descriptive of vehicle conditions, including, for example: light detection and ranging (LIDAR) data; radio detection and ranging (RADAR) data; imagery collected by one or more cameras on-board the autonomous vehicle; accelerometer data; positioning system data; gyroscope data; throttle position data; engine or crankshaft torque data; exhaust oxygen data; engine air flow data; engine RPM data; vehicle control data associated with a vehicle controller; and/or any other form of vehicle data associated with the vehicle (e.g., collected or produced by sensors on-board the vehicle). As indicated above, the systems and methods of the present disclosure can perform driving event detection based on such vehicle data.

Example systems and methods that can be implemented or otherwise used by the present disclosure to detect driving events are described in U.S. patent application Ser. No. 15/469,981 filed Mar. 27, 2017 and titled "Machine Learning for Event Detection and Classification in Autonomous Vehicles." U.S. patent application Ser. No. 15/469,981 is hereby incorporated by reference in its entirety. Other techniques for automatic detection of driving events can be used in addition to the techniques described in U.S. patent application Ser. No. 15/469,981.

In some implementations, the systems of the present disclosure can detect an occurrence of a driving event based at least in part on telematics data generated by the autonomous vehicle. For example, telematics data can include any type of data (e.g., navigational data such as vehicle location, vehicle data, etc.) generated by the autonomous vehicle and transmitted to a central computing system. In some implementations, the central computing system can detect a driving event based on received telematics data and, thereafter, can notify the human machine interface device or user computing device to provide the interactive user interface in response to the detected driving event. Alternatively, a computing system or device included on-board the autonomous vehicle (e.g., the human machine interface device) can analyze the telematics data to detect driving event(s).

In some implementations, the systems of the present disclosure can detect an occurrence of a driving event based at least in part on data collected by the human machine interface computing device that describes motion experienced by the passenger. For example, the human machine interface device can include its own set of sensors such as, for example, accelerometers, inertial measurement units, gyroscopes, etc. The human machine interface device or other system device can analyze the sensor data generated by the sensors of the human machine interface device and can detect driving events based on such analysis (e.g., by applying the techniques described in U.S. patent application Ser. No. 15/469,981 to the data collected by the human machine interface computing device).

In some implementations, the systems of the present disclosure can detect an occurrence of a driving event based at least in part on data collected by the user computing device that describes motion experienced by the passenger. For example, the user computing device can include its own set of sensors such as, for example, accelerometers, inertial measurement units, gyroscopes, etc. The user computing device can transmit data generated by such sensors to the human machine interface device or other system/device of the autonomous vehicle. The human machine interface device or other system/device can analyze the sensor data generated by the sensors of the user computing device and can detect driving events based on such analysis (e.g., by applying the techniques described in U.S. patent application Ser. No. 15/469,981 to the data collected by the user computing device).

According to another aspect, in response to detection of the occurrence of the driving event, the systems of the present disclosure can provide an interactive user interface. For example, the user interface can be displayed on a display portion of the human machine interface device (e.g., a rear-seat display, handheld display, etc.), on a display of the user computing device, or in other manners or locations. The interactive user interface can enable a passenger of the autonomous vehicle to enter passenger feedback regarding the occurrence of the driving event performed by the autonomous vehicle. For example, a touch-sensitive display can receive passenger input via touch. Other input devices can be used as well such as, for example, a mouse, a keyboard or keypad, a touch pad, a click wheel, keyboard, etc.

In some implementations, the user interface is not displayed on a display device, but instead may be, as one example, audio-based. For example, a speaker included in the autonomous vehicle may prompt the user to provide a voice response that includes passenger feedback regarding the occurrence of the driving event performed by the autonomous vehicle. As another example, the user interface can be embodied in one or more physical buttons, knobs, sliders, levers, or the like which enable a user to provide passenger feedback through manipulation of such physical components. As yet another example, passenger feedback can be obtained through analysis of imagery captured by a camera. For example, computer vision techniques can be applied to imagery to assess or identify gestures, speech, eye movement, and/or facial expressions indicative of passenger comfort and/or satisfaction.

In some implementations, the user interface can include a plurality of user-selectable icons that respectively correspond to a plurality of levels of satisfaction. The passenger can select one of the plurality of user-selectable icons to provide passenger feedback indicative of the corresponding level of satisfaction. As one example, the user-selectable icons can correspond to very unsatisfied, unsatisfied, neutral, satisfied, and very satisfied. However, many other divisions or levels of satisfaction can be used instead of these example levels. In some implementations, the plurality of user-selectable icons can be included within a single graphical item (e.g., a plurality of user-selectable notches along an axis). In some implementations, rather than discrete levels of satisfaction, a slider, dial, knob or other physical or virtual feature can enable the passenger to provide feedback along a continuous spectrum of satisfaction level.

In some implementations, the user interface can initially include an initial user-selectable icon that enables the passenger to indicate a desire to provide the passenger feedback. For example, the initial user-selectable icon can be a single selectable space that depicts a cluster of buttons or icons. After receipt of a user selection of the initial user-selectable icon, the user interface can then provide the plurality of user-selectable icons that respectively correspond to the plurality of levels of satisfaction. For example, the cluster of buttons or icons can visually spread apart and become independently selectable.

In some implementations, in response to receiving a passenger feedback that selects one of the plurality of user-selectable icons, the systems of the present disclosure can modify the user interface to subsequently provide a secondary menu that provides a second plurality of user-selectable icons. As one example, the second plurality of user-selectable icons can respectively correspond to a plurality of textual phrases that respectively describe different reasons for the indicated level of satisfaction. As examples, the textual phrases may include phrases such as "too fast,"

"too slow," "too close to other vehicles," "turned too wide," etc. In some implementations, the second plurality of user-selectable icons are not textual in nature but instead include a graphical depiction of different reasons for the indicated level of satisfaction (e.g., a graphical depiction of a vehicle taking an over-wide turn). In some implementations, the systems of the present disclosure modify the user interface to provide the secondary menu only when the passenger selects one of the plurality of user-selectable icons that corresponds to a negative level of satisfaction (or some other defined subset of the icons). In some implementations, additional levels of hierarchical feedback menus beyond the secondary menu can be used.

In some implementations, the interactive user interface can include a visualization of the autonomous vehicle during performance of the detected driving event. As one example, the visualization can visualize or otherwise be generated based at least in part on light detection and ranging data collected by the autonomous vehicle during performance of the driving event. Providing a visualization of the autonomous vehicle during performance of the detected driving event within the user interface can enable the passenger to visually review the driving event while providing the passenger feedback.

In some implementations, the interactive user interface can be specific to and associated with the particular detected driving event. In particular, the interactive user interface that is specific to and associated with the particular detected driving event can be different from at least one alternative user interface that is specific to and associated with at least one alternative driving event. As one example, different sets of user-selectable icons can be provided respectively for different events. As another example, different secondary menu items can be provided respectively for different events. For example, secondary menu items provided in response to a turning event can include textual phrases specific to turning events (e.g., "turned too wide," "turned too narrow," etc.), while secondary menu items provided in response to a stopping event can include textual phrases specific to stopping events (e.g., "stopped too late," "stopped too early," etc.). As a still further example, different identifiers can be provided within the interactive user interface to help distinguish each event from other events. To provide an example, a textual, map-based, or other visual identifier(s) can identify a "turn onto Center Street" from "a turn onto First Street." Any other aspects of the user interface (e.g., font, formatting, size, number of icons, type of icons, number of identifiers, type of identifiers, etc.) can be modified to provide interfaces that are specific to respective driving event(s).

In some implementations, the interactive user interface can request that the passenger provides passenger feedback that identifies the driving event. For example, the feedback collection system may have identified that a driving event occurred but be unable to determine the exact nature of the driving event. Thus, the interactive user interface can request that the passenger provides passenger feedback that identifies the driving event. For example, the user interface can request that the passenger provides passenger feedback that narrows the driving event from a general category (e.g., stopping event) to a specific type (e.g., stopping at stop sign event vs. stopping at crosswalk event vs. stopping at traffic light event vs. stopping due to humanly-guided (e.g., traffic officer) traffic stop event, etc.).

In some implementations, the interactive user interface can request that the passenger provides passenger feedback relative to multiple overlapping driving events (e.g., events that overlap in time). For example, the passenger can provide discrete feedback for each overlapping event or can provide feedback for the series of events as a whole.

In some implementations, after receiving the passenger feedback, the systems of the present disclosure can associate the passenger feedback with one or more of: an identification of the driving event performed by the autonomous vehicle, a time at which the driving event occurred, a location at which the driving event occurred, and data collected by the autonomous vehicle during performance of the driving event. In some implementations, associating the passenger feedback with one or more of such items can include storing the passenger feedback in a database or other data representation where it is relationally associated with such one or more items. The passenger feedback can be stored locally and then transferred to a central computing system as a batch offline and/or can be transmitted to the central computing system as soon as it is received by the vehicle from the passenger.

Collection and association of passenger feedback in such fashion enables advanced recall and analysis of passenger feedback based on time, location, driving event, vehicle data, other factors, or combinations thereof.

In particular, according to another aspect of the present disclosure, after collection of a significant amount of passenger feedback using the techniques described above, the systems and methods of the present disclosure (e.g., a central computing system) can correlate and combine the feedback data to assess the general performance of a fleet of autonomous vehicles. The performance of the fleet of autonomous vehicles can be assessed according to different metrics and/or across different dimensions or combinations of dimensions. As one example, the performance of all vehicles when making right hand turns between 10 PM and 11 PM can be analyzed. As another example, the performance of all vehicles at a single location or set of locations can be analyzed. As another example, an analysis of the aggregate passenger feedback can result in identification of locations where passengers routinely provide negative feedback. This can enable a development team to study and understand the particular factors (e.g., incorrect map data) that led to such consistent negative feedback. Alternatively or additionally, locations at which aggregate passenger feedback is significantly negative can be marked as off-limits for autonomous vehicles until the issue is resolved.

In yet another example aspect of the present disclosure, the systems and methods described herein can detect that a particular passenger of an autonomous vehicle is visiting a location at which the passenger previously provided passenger feedback or that the particular passenger is being subjected to a driving event for which the passenger previously provided passenger feedback. In response, the systems and methods of the present disclosure can request the passenger provides new passenger feedback. Receipt of additional passenger feedback can enable an evaluation of whether any improvement in autonomous vehicle performance has been achieved in the time period between respective passenger feedbacks, as indicated by a change in the feedback.

The systems and methods of the present disclosure provide a number of technical effects and benefits. For example, by prompting passenger feedback in response to specific detected driving events, the systems and methods of the present disclosure enable collection of passenger feedback that is correlated to certain driving events. Thus, as one technical benefit, the systems and methods of the present disclosure provide an improved vehicle performance analysis system that enables advanced and more granular detection and analysis of particular events that result in poor passenger satisfaction. In addition, in some implementations, the passenger feedback includes non-textual (e.g., numerical or categorical) descriptions of their human satisfaction level and/or detailed textual descriptions of their subjective human sense of what was right or wrong about the driving event. Thus, as another technical benefit, the systems and methods of the present disclosure provide an improved vehicle performance analysis system that enables large-scale collection of both textual and non-textual human perception information regarding autonomous driving behavior, which can be correlated to time, location, vehicle data, and/or any other available data dimensions.

As another technical benefit, the disclosure can improve the performance of computing hardware or other computing resources of the autonomous vehicle. For example, by prompting a passenger to log and/or provide feedback regarding driving event(s), limited computing and/or hardware resources of the autonomous vehicle are not required to be allocated to the task of characterizing driving events in real time. Thus, the processing power or other computing or hardware resources of autonomous vehicle can be allocated and utilized to perform other tasks (e.g., vehicle motion control) rather than driving event characterization, thereby improving the processing efficiency and performance of the autonomous vehicle. In particular, improved allocation of resources can allow the autonomous vehicle to provide more efficient, reliable, and accurate autonomous driving.

Moreover, in some implementations, the computing device(s) that perform driving event detection and feedback collection can be separate from the autonomy computing system that controls motion of the autonomous vehicle. As such, in such implementations, the autonomy computing system can include a simplified hardware architecture that is easier to upgrade, implement mode/redundancy checks, etc.

With reference now to the Figures, example embodiments of the present disclosure will be discussed in further detail.

Example Devices and Systems

FIG. 1 depicts a block diagram of an example computing system according to example embodiments of the present disclosure. The example computing system includes an autonomous vehicle 10, a central computing system 170, and a user computing device 175 that are communicatively coupled over one or more communication networks 180. The autonomous vehicle 10 can include one or more sensors 101, an autonomy computing system 102, one or more vehicle controls 107, and a human machine interface device 150. The sensors 101, autonomy computing system 102, and vehicle controls 107 will be discussed in further detail below with reference to FIG. 2.

The human machine interface device 150 can enable communication, control, and/or other interface actions to occur between the autonomous vehicle 10 and a human (e.g., a passenger located within the autonomous vehicle 10). The human machine interface device 150 can be communicatively coupled to the autonomy computing system 102 to enable exchange of data, instructions, and/or requests between the system 102 and the device 150.

The human machine interface device 150 can include or be implemented by one or more computing devices that are operatively connected. The human machine interface device 150 can be an embedded computing device or a stand-alone computing device. In one particular example, the human machine interface device 150 can be a tablet computing device that is positioned within the autonomous vehicle 10 (e.g., within a rear seat area of the autonomous vehicle 10).

The human machine interface device 150 can include one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage media, such as RAM, ROM, EEPROM, EPROM, one or more memory devices, flash memory devices, etc., and combinations thereof.

The memory 154 can store information that can be accessed by the one or more processors 152. For instance, the memory 154 (e.g., one or more non-transitory computer-readable storage mediums, memory devices) can store data that can be obtained, received, accessed, written, manipulated, created, and/or stored. The memory 154 can also store computer-readable instructions that can be executed by the one or more processors 152. The instructions can be software written in any suitable programming language or can be implemented in hardware. Additionally, or alternatively, the instructions can be executed in logically and/or virtually separate threads on processor(s) 152. For example, the memory 154 can store instructions that when executed by the one or more processors 152 cause the one or more processors 152 to perform any of the operations and/or functions described herein.

According to an aspect of the present disclosure, the human machine interface device 150 can facilitate the prompting, collection, and/or entry of autonomous vehicle passenger feedback. In particular, the human machine interface device 150 can utilize one or more interactive user interfaces to enable passengers to enter passenger feedback.

In particular, according to an aspect of the present disclosure, the human machine interface device 150 and/or the autonomy computing system 102 can actively detect an occurrence of a driving event and, in response, prompt the passenger to provide feedback regarding his/her subjective response to such driving event. In such fashion, passenger feedback regarding specific instances and/or types of driving events can be collected, enabling more advanced and granular understanding and refinement of the autonomous vehicle technology relative to particular types of driving events and/or particular physical locations.

Figure 3:
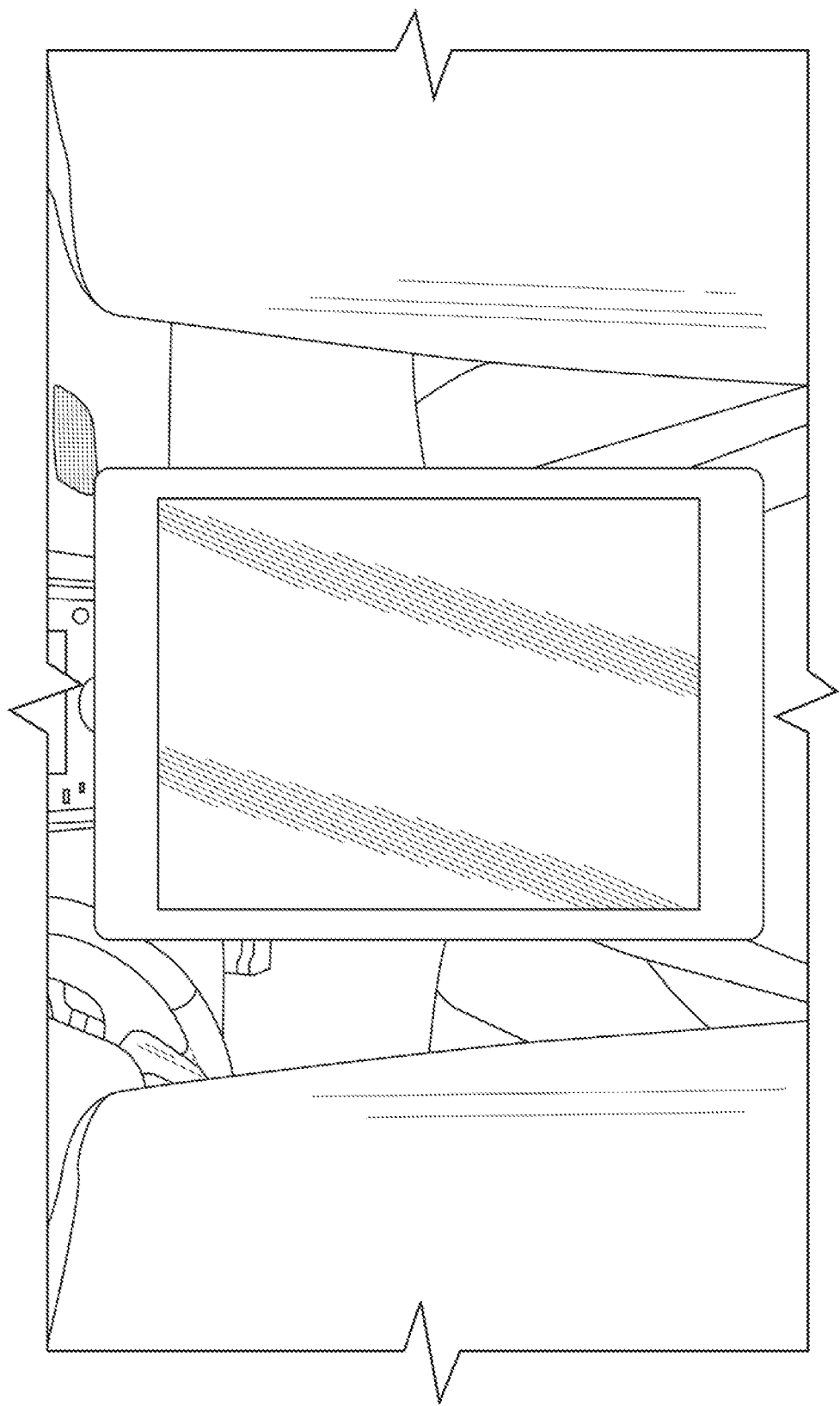
FIG. 3 depicts an example rear-seat display device according to example embodiments of the present disclosure.

In some implementations, the human machine interface device 150 can include a display device 158 (e.g., a touch-sensitive display device) and/or other input/output components 160 that provide an interactive user interface (e.g., through which the passenger can provide passenger feedback). For example, the display device 158 can be a rear-seat display device that is accessible by a passenger that is located in a rear seat of the autonomous vehicle. As one example, FIG. 3 depicts an example rear-seat display device according to example embodiments of the present disclosure.

Referring again to FIG. 1, in some implementations, in addition or alternatively to the human machine interface device 150, the systems and methods of the present disclosure can include or leverage a user computing device 175 that is associated with the passenger. For example, in some implementations, in addition or alternatively to the display of the user interface by the human machine interface device 150, the interactive user interface can be provided on or accessible via a display of the user computing device 175. The user computing device 175 can be communicatively connected to the human machine interface device 150 via a local area network such as a short range wireless connection (e.g., a Bluetooth, ZigBee, NFC, infrared, etc.) or other forms of connections (e.g., hardwiring). As examples, the user computing device 175 can be a smartphone, tablet computing device, wearable computing device, portable gaming device, hand-held display screen, or other forms of computing devices.

In yet further implementations, certain operations described herein can be performed by a central computing system 170 that is remotely located to the autonomous vehicle 10 and in communication with the autonomous vehicle over one or more wireless networks 180 (e.g., cellular data networks, satellite communication networks, wide area networks, etc.). As an example, the central computing system 170 can include one or more server computing devices. In the event that plural server computing devices are used, the server computing devices can be arranged according to a parallel computing architecture, a sequential computing architecture, or combinations thereof. In some implementations, the central computing system 170 can provide control, monitoring, management, and/or other functionality for a fleet of autonomous vehicles 10.

According to an aspect of the present disclosure, the computing system illustrated in FIG. 1 can detect an occurrence of a driving event performed by the autonomous vehicle 10. For example, the human machine interface device 150, the autonomy computing system 102, and/or other communicatively coupled devices or systems (e.g., central computing system 170) can include an event detector 156 that continuously, near-continuously, or periodically assesses available data (e.g., received from sensors 101 and/or autonomy computing system 102) to detect the occurrence of a driving event performed by the autonomous vehicle 10. In the example system of FIG. 1, the event detector 156 is illustrated as being included within or otherwise implemented by the human machine interface device 150. However, as noted, the event detector 156 can alternatively be included in or otherwise implemented by other devices or components, including, for example, the autonomy computing system 102.

Example types of driving events include routine driving events such as a turn event, a lane change event, or a stopping event. As other examples, driving events can include undesirable driving events such as a high acceleration event, a high deceleration event or hard braking event, a juke motion event, a jerk motion event, a weaving motion event, an excessive speed event, an insufficient speed event, or other events that reduce the quality of ride experienced by a human passenger of the autonomous vehicle (e.g., cause the ride to be uncomfortable to a human passenger).

In some implementations, the event detector 156 can detect an occurrence of a driving event based at least in part on turn-by-turn data associated with a navigational system 164 included in the autonomous vehicle. For example, the navigational system 164 can be included in the autonomy system and/or the human machine interface device 150 (as is illustrated in FIG. 1). The navigational system 164 can monitor a current location of the autonomous vehicle 10 (e.g., via GPS or other positioning systems and/or data from sensors 101) relative to a route that includes one or more navigational maneuvers. When the current location of the vehicle 10 indicates that it has completed a navigational maneuver (e.g., a turn event), the navigational system 164 and/or the event detector 156 can detect that such driving event has occurred and cause a prompt for passenger feedback to occur. Thus, turn-by-turn or other navigational information can be used to detect the occurrence of a driving event.

In some implementations, the event detector 156 can detect an occurrence of a driving event based at least in part on vehicle data collected by the autonomous vehicle 10. For example, the vehicle data can be descriptive of vehicle conditions associated with the autonomous vehicle 10 during an autonomous driving session. In some implementations, the vehicle data can include data collected by or otherwise received from various sensors 101 included in the autonomous vehicle 10. As examples, the vehicle data can include data descriptive of a speed (also referred to as velocity) and/or data descriptive of a steering angle of the autonomous vehicle 10. As another example, additional vehicle data can be obtained or generated that is descriptive of a lateral acceleration of the autonomous vehicle 10. For example, in some implementations, lateral acceleration can be a function of the speed of the vehicle and the steering angle of the vehicle. Thus, in some implementations, lateral acceleration data can be generated from speed data and steering angle data.

As further examples, the vehicle data can include various types of data descriptive of vehicle conditions, including, for example: light detection and ranging (LIDAR) data; radio detection and ranging (RADAR) data; imagery collected by one or more cameras on-board the autonomous vehicle; accelerometer data; positioning system data; gyroscope data; throttle position data; engine or crankshaft torque data; exhaust oxygen data; engine air flow data; engine RPM data; vehicle control data associated with a vehicle controller; and/or any other form of vehicle data associated with the vehicle 10 (e.g., collected or produced by sensors 101 on-board the vehicle). As indicated above, the event detector 156 can perform driving event detection based on such vehicle data.

In some implementations, the event detector 156 can detect an occurrence of a driving event based at least in part on telematics data generated by the autonomous vehicle 10. For example, telematics data can include any type of data (e.g., navigational data such as vehicle location, vehicle data, etc.) generated by the autonomous vehicle 10 and transmitted to the central computing system 170. In some implementations, the central computing system 170 can detect a driving event based on received telematics data and, thereafter, can notify the human machine interface device 150 or user computing device 175 to provide the interactive user interface in response to the detected driving event. Alternatively, a computing system or device included on-board the autonomous vehicle (e.g., the human machine interface device 150) can analyze the telematics data to detect driving event(s).

In some implementations, the event detector 156 can detect an occurrence of a driving event based at least in part on data collected by the human machine interface computing device 150 that describes motion experienced by the passenger. For example, the human machine interface device 150 can include its own set of sensors 162 such as, for example, accelerometers, inertial measurement units, gyroscopes, etc. The event detector 156 can analyze the sensor data generated by the sensors 162 of the human machine interface device 150 and can detect driving events based on such analysis.

In some implementations, the event detector 156 can detect an occurrence of a driving event based at least in part on data collected by the user computing device 175 that describes motion experienced by the passenger. For example, the user computing device 175 can include its own set of sensors such as, for example, accelerometers, inertial measurement units, gyroscopes, etc. The user computing device 175 can transmit data generated by such sensors to the human machine interface device 150 or other system/device of the autonomous vehicle 10. The event detector 156 can analyze the sensor data generated by the sensors of the user computing device 175 and can detect driving events based on such analysis.

As one example of how the event detector 156 can operate, in some implementations of the present disclosure, the event detector 156 can include or otherwise leverage one or more machine learned classifier models that can perform event detection on the basis of various features extracted from the above described forms of data, such as, for example, vehicle data, telematics data, user device sensor data, human machine interface device sensor data, etc. For example, the features can be extracted by performing a continuous wavelet transform or other feature extraction technique on the vehicle data or other forms of data described above.

Existing data logs that include event labels recorded by a human passenger can be used to train the machine learned classifier model. For example, the classifier model can be trained using an objective function that describes a difference between predictions made by the classifier model on the existing data log and the event labels associated with the data log.

In some implementations, the event detector 156 can obtain the vehicle data or other forms of data described above. The event detector 156 can include a data preprocessor that preprocesses the data to prepare it for event analysis. As an example, in some implementations, the data preprocessor can process the raw data (e.g., raw sensor data) to determine a state of the vehicle at a given time. For example, the state of the vehicle at a given time can include information describing one or more of the following parameters for the vehicle: timestamp; speed; steering angle; longitudinal acceleration; geographic location; and/or other parameters. In some implementations, preprocessing the data can include applying one or more filters to the data. For example, the applied filters can include an average filter, a median filter, and/or a low pass filter. Applying filters in such fashion can smooth the data to reduce noise. In some implementations, the data can be preprocessed by the autonomous vehicle in real-time prior to storage in a data log. In some implementations, the data is not preprocessed.

According to another aspect of the present disclosure, the event detector 156 can include a feature extractor that extracts a plurality of features from the data (e.g., the preprocessed data). In some implementations, the feature extractor can perform even sampling on the data by sampling the data at evenly spaced time points. In other implementations, sampling of the data may be unevenly spaced. In yet further implementations, the feature extractor can continuously or near-continuously sample the data. In some implementations, each sample of the data can include a window of data around a particular sampling time.

Regardless, for each instance of sampling of the data, the feature extractor can extract one or more features from the data. As examples, the extracted features can include speed feature(s), steering angle feature(s), lateral acceleration feature(s), or other types of features. Generally, the features can be of any type that is useful for detecting and classifying events.

In particular, in some implementations, the feature extractor can perform a feature extraction technique on the data to extract the plurality of features. Example feature extraction techniques that can be performed include the continuous wavelet transform technique, the short-term Fourier transform, and/or other time-frequency analysis techniques. When performing the continuous wavelet transform technique, one or more of various wavelets can be used including, as examples: the Haar wavelet; the Daubechies wavelets; the Biorthogonal wavelets; the BD wavelet; the Coiflets wavelets; the Symlets wavelets; the Morlet wavelet; the Mexican Hat wavelet; the Meyer wavelet; and/or other wavelets. In particular, performing continuous wavelet transform with the Mexican Hat wavelet and/or the BD wavelet can be particularly beneficial for extracting features useful for detection of events of high acceleration, high deceleration, and/or juke.

Thus, as an example, the feature extractor can sample the data (e.g., speed data, steering angle data, lateral acceleration data, and/or other vehicle data channels or representations) and perform continuous wavelet transform (or other feature extraction techniques) on each channel of the sampled data. In particular, in some implementations, performing continuous wavelet transform (or other feature extraction techniques) on the sampled data can include determining a plurality of scale components for each channel of data. For example, a selected wavelet (e.g., the Mexican Hat wavelet) can be scaled according to a number of scale values. For example, in some implementations, approximately one hundred scale values can be used. Thus, to provide a particular example for the purpose of illustration, the feature extractor can perform continuous wavelet transform on sampled speed data at one hundred scale values of the Mexican Hat wavelet, which can result in one hundred scale components for the speed data per instance of sampling. In some implementations, the scale components can directly be used as features for detecting and classifying events.

In addition, in some implementations, the feature extractor can compute, for each channel of data, a set of statistics that describe the plurality of scale components for each sample of such channel of data. As examples, the computed statistics for each channel of data can include one or more of: a mean of the plurality of scale components, a standard deviation of the plurality of scale components, a maximum of the plurality of scale components, a minimum of the plurality of scale components, and a moment of the plurality of scale components. For example, a moment of a scale component can correspond to the scale value multiplied by the magnitude of such scale component or, in other terms, can correspond to the frequency multiplied by the wavelet amplitude. Thus, to continue the particular example provided above, the feature extractor can compute a set of statistics for the one hundred scale components for the speed data per instance of sampling. In addition, in some implementations, statistics can be computed over an extended time window (e.g., one minute) for use in jumpy detection. In some implementations, the computed statistics can be used as features for detecting and classifying events in addition or alternatively to use of the scale components directly as features.

In some implementations, the features extracted for each time sample of the data (e.g., scale components and/or statistics for scale components) can be input into the classifier model included in the event detector 156 to receive a classification for such sample of data. For example, the classifier can receive the features extracted from some or all of the data channels for a given time sample and, in response, provide a classification based on the received features for such time sample. The classification can be a binary classification or a multinomial classification.

In other implementations, the event detector 156 can include a candidate event detector that analyzes the features extracted for each time sample of the data and identifies whether such time sample includes one or more candidate events. Thus, in some implementations, only features that have been identified as corresponding to one or more candidate events are input into the classifier model, which may, in some instances, enhance system efficiency.

In some implementations, the candidate event detector can identify candidate events based on the extracted features. For example, in some implementations, the candidate event detector can identify one or more relative peaks associated with the plurality of scale components determined for a particular data channel. As one example, a relative peak can be identified at each instance in which the absolute value of a scale component is greater than the mean of the absolute value of such scale component. Each identified peak can be regarded as or otherwise correspond to a candidate event.

As described above, the features extracted for a particular time sample of the data (e.g., a time sample identified as corresponding to one or more candidate events) can be input into the classifier model to receive a classification for such sample of data (e.g., for each identified candidate event). For example, the classifier can receive the features extracted from some or all of the data channels for a given time sample and, in response, provide a classification based on the received features for such time sample or corresponding candidate event(s). In some implementations, data can also be provided as inputs to the classifier model in addition to the extracted features. The classification can be a binary classification (e.g., identify a single classification) or a multinomial classification (e.g., provide a relative score or probability for each available classification). Example event classifications include: a high deceleration classification, a high acceleration classification, a juke classification, a jerk classification, a weaving classification, a "no event" classification, an "other" classification, and/or any example event types described herein, and/or any other types of classification that are desired to be detected. In some implementations, the classifier model can further perform jumpy detection in which a large number of events within a time window (e.g., one minute) are detected.

As examples, the classifier model can be or include one or more machine-learned models such as, for example, a logistic regression classifier, a support vector machine, one or more decision trees, a neural network, and/or other types of models including both linear and non-linear models. Neural networks can include deep neural networks, feed-forward neural networks, recurrent neural networks (e.g., long short-term memory recurrent neural networks), convolutional neural networks, or combinations thereof.

According to another aspect of the present disclosure, existing data logs that include event labels recorded by a human passenger can be used to train the classifier model. In particular, a human co-pilot or passenger can ride in an autonomous vehicle and make a record of when particular events occur. At the same time, the autonomous vehicle can record or otherwise store its collected data. The humanly-generated events records can be attached to the data collected by the autonomous vehicle at such time. Thus, use of a human passenger to provide manual labels can result in a corpus of data logs that include event labels that are generally aligned in time with data that reflects such events.

According to an aspect of the present disclosure, such corpus of data logs with event labels can be used to train the classifier model.

However, using a human passenger to create and complete event records can, in some instances, cause a delay between when the event occurred and when the record was created, thereby leading to at least some of the event records having a slight delay in their timestamp relative to when the event occurred. To remedy this issue, in some implementations, the systems of the present disclosure can apply or re-apply each event label to any potentially referenced events that occurred within some time window prior to the timestamp of such event label. Thus, for each event label included in the data log, the computing system can identify a plurality of potentially referenced events within a time window prior to the particular time associated with the event label and associate the event label with each of the plurality of potentially referenced events. To provide an example, for a particular high acceleration event label, all potential events of high acceleration (e.g., instances in which acceleration is greater than a threshold value) within a sixty second window prior to the event label can be labeled as positives for high acceleration events. In other implementations, candidate events within the time window can be identified as described above (e.g., through identification of relative peaks in scale components), and the event label can be applied to each of such candidate events. Other techniques can be used to apply the manual event labels to their corresponding features as well.

In some implementations, to generate the training data from the data logs and manual labels, the systems and methods of the present disclosure can extract, for each time at which an event label has been applied to the data, one or more features from the data log. For example, the feature extraction process described above can be applied at each instance in which a label has been applied to the data. The event label can then be associated with the one or more features extracted from the data log for the corresponding time or vice versa. Thus, as a result, a training set can be generated that includes a plurality of sets of features, where each set of features is labeled with a particular event label (e.g., "high acceleration").

The classification model can be trained using such training data. In particular, in some implementations, a training computing system can, for each pair of extracted features and corresponding event label, input the extracted features into the classifier model; receive at least one classification as an output of the classifier model; and evaluate an objective function that describes a difference between the at least one classification and the event label that corresponds to the input features. The training system can train the classifier model based at least in part on the objective function. As one example, in some implementations, the objective function can be backpropagated through the classifier model to train the classifier model. In such fashion, the classifier model can be trained to provide a correct event classification based on the receipt of features extracted from data.

The event detector 156 can include computer logic utilized to provide desired functionality. In some implementations, the event detector 156 can be implemented in hardware, firmware, and/or software controlling a general purpose processor. For example, in some implementations, the event detector 156 includes program files stored on a storage device, loaded into a memory and executed by one or more processors. In other implementations, the event detector 156 includes one or more sets of computer-executable instructions that are stored in a tangible computer-readable storage medium such as RAM hard disk or optical or magnetic media.

According to another aspect of the present disclosure, in response to detection of the occurrence of the driving event by the event detector 156, the computing system illustrated in FIG. 1 can provide an interactive user interface. For example, the user interface can be displayed on a display portion 158 of the human machine interface device 150 (e.g., a rear-seat display, handheld display, etc.), on a display of the user computing device 175, or in other manners or locations. The interactive user interface can enable a passenger of the autonomous vehicle 10 to enter passenger feedback regarding the occurrence of the driving event performed by the autonomous vehicle 10. For example, a touch-sensitive display can receive passenger input via touch. Other input components 160 can be used as well such as, for example, a mouse, a keyboard or keypad, a touch pad, a click wheel, keyboard, etc.

In some implementations, the user interface is not displayed on a display device (e.g., display 158), but instead may be, as one example, audio-based. For example, a speaker included in the human machine interface device 150 or other system component may prompt the user to provide a voice response that includes passenger feedback regarding the occurrence of the driving event performed by the autonomous vehicle. For example, a personal assistant or other artificial intelligence-based technology can interact with the passenger via voice conversation to obtain feedback.

As another example, the user interface can be embodied in one or more physical buttons, knobs, sliders, levers, or other user input components 160 which enable a user to provide passenger feedback through manipulation of such physical components.

As yet another example, passenger feedback can be obtained through analysis of imagery captured by a camera. For example, computer vision techniques can be applied to imagery to assess or identify gestures, speech, eye movement, and/or facial expressions indicative of passenger comfort and/or satisfaction (e.g., thumbs up versus thumbs down).

In some implementations, after receiving the passenger feedback, the human machine interface device 150 or other system component can associate the passenger feedback with one or more of: an identification of the driving event performed by the autonomous vehicle, a time at which the driving event occurred, a location at which the driving event occurred, and data collected by the autonomous vehicle 10 during performance of the driving event. In some implementations, associating the passenger feedback with one or more of such items can include storing the passenger feedback in a database or other data representation where it is relationally associated with such one or more items. The passenger feedback can be stored locally (e.g., by memory 154) and then transferred to the central computing system 170 as a batch offline and/or can be transmitted to the central computing system 170 as soon as it is received by the vehicle 10 from the passenger.

The network(s) 180 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 180 can be accomplished, for instance, via a network interface using any type of protocol, protection scheme, encoding, format, packaging, etc.

Figure 2:
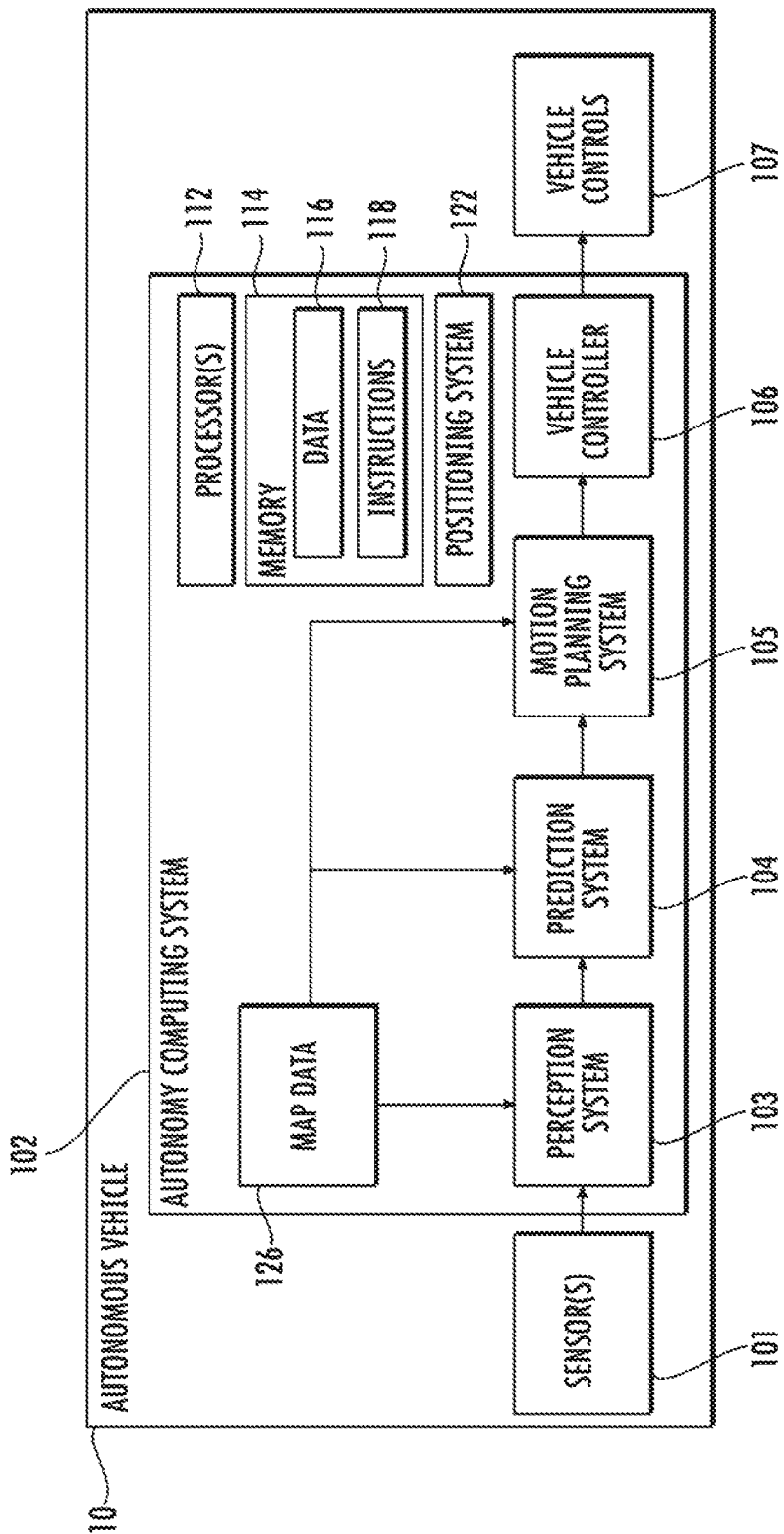
FIG. 2 depicts a block diagram of an example autonomous vehicle according to example embodiments of the present disclosure.

FIG. 2 depicts a block diagram of the example autonomous vehicle 10 in further detail according to example embodiments of the present disclosure. The autonomous vehicle 10 is capable of sensing its environment and navigating without human input. The autonomous vehicle 10 can be a ground-based autonomous vehicle (e.g., car, truck, bus, etc.), an air-based autonomous vehicle (e.g., airplane, drone, helicopter, or other aircraft), or other types of vehicles (e.g., watercraft).

The autonomous vehicle 10 includes one or more sensors 101, the autonomy computing system 102, and one or more vehicle controls 107. The autonomy computing system 102 can assist in controlling the autonomous vehicle 10. In particular, the autonomy computing system 102 can receive sensor data from the one or more sensors 101, attempt to comprehend the surrounding environment by performing various processing techniques on data collected by the sensors 101, and generate an appropriate motion path through such surrounding environment. The autonomy computing system 102 can control the one or more vehicle controls 107 to operate the autonomous vehicle 10 according to the motion path.

The autonomy computing system 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage media, such as RAM, ROM, EEPROM, EPROM, one or more memory devices, flash memory devices, etc., and combinations thereof.

The memory 114 can store information that can be accessed by the one or more processors 112. For instance, the memory 114 (e.g., one or more non-transitory computer-readable storage mediums, memory devices) can store data 116 that can be obtained, received, accessed, written, manipulated, created, and/or stored. In some implementations, the computing system 102 can obtain data from one or more memory device(s) that are remote from the system 102.

The memory 114 can also store computer-readable instructions 118 that can be executed by the one or more processors 112. The instructions 118 can be software written in any suitable programming language or can be implemented in hardware. Additionally, or alternatively, the instructions 118 can be executed in logically and/or virtually separate threads on processor(s) 112.

For example, the memory 114 can store instructions 118 that when executed by the one or more processors 112 cause the one or more processors 112 to perform any of the operations and/or functions described herein.

In some implementations, autonomy computing system 102 can further include a positioning system 122. The positioning system 122 can determine a current position of the vehicle 10. The positioning system 122 can be any device or circuitry for analyzing the position of the vehicle 10. For example, the positioning system 122 can determine position by using one or more of inertial sensors, a satellite positioning system, based on IP address, by using triangulation and/or proximity to network access points or other network components (e.g., cellular towers, WiFi access points, etc.) and/or other suitable techniques. The position of the vehicle 10 can be used by various systems of the autonomy computing system 102.

As illustrated in FIG. 2, the autonomy computing system 102 can include a perception system 103, a prediction system 104, and a motion planning system 105 that cooperate to perceive the surrounding environment of the autonomous vehicle 10 and determine a motion plan for controlling the motion of the autonomous vehicle 10 accordingly.

In particular, in some implementations, the perception system 103 can receive sensor data from the one or more sensors 101 that are coupled to or otherwise included within the autonomous vehicle 10. As examples, the one or more sensors 101 can include a Light Detection and Ranging (LIDAR) system, a Radio Detection and Ranging (RADAR) system, one or more cameras (e.g., visible spectrum cameras, infrared cameras, etc.), and/or other sensors. The sensor data can include information that describes the location of objects within the surrounding environment of the autonomous vehicle 10.

As one example, for a LIDAR system, the sensor data can include the location (e.g., in three-dimensional space relative to the LIDAR system) of a number of points that correspond to objects that have reflected a ranging laser. For example, a LIDAR system can measure distances by measuring the Time of Flight (TOF) that it takes a short laser pulse to travel from the sensor to an object and back, calculating the distance from the known speed of light.

As another example, for a RADAR system, the sensor data can include the location (e.g., in three-dimensional space relative to the RADAR system) of a number of points that correspond to objects that have reflected a ranging radio wave. For example, radio waves (pulsed or continuous) transmitted by the RADAR system can reflect off an object and return to a receiver of the RADAR system, giving information about the object's location and speed. Thus, a RADAR system can provide useful information about the current speed of an object.

As yet another example, for one or more cameras, various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in imagery captured by the one or more cameras. Other sensor systems can identify the location of points that correspond to objects as well.

Thus, the one or more sensors 101 can be used to collect sensor data that includes information that describes the location (e.g., in three-dimensional space relative to the autonomous vehicle 10) of points that correspond to objects within the surrounding environment of the autonomous vehicle 10.

In addition to the sensor data, the perception system 103 can retrieve or otherwise obtain map data 126 that provides detailed information about the surrounding environment of the autonomous vehicle 10. The map data 126 can provide information regarding: the identity and location of different travelways (e.g., roadways), road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travelway); traffic control data (e.g., the location and instructions of signage, traffic lights, or other traffic control devices); and/or any other map data that provides information that assists the computing system 102 in comprehending and perceiving its surrounding environment and its relationship thereto.

The perception system 103 can identify one or more objects that are proximate to the autonomous vehicle 10 based on sensor data received from the one or more sensors 101 and/or the map data 126. In particular, in some implementations, the perception system 103 can determine, for each object, state data that describes a current state of such object. As examples, the state data for each object can describe an estimate of the object's: current location (also referred to as position); current speed (also referred to as velocity); current acceleration; current heading; current orientation; size/footprint (e.g., as represented by a bounding shape such as a bounding polygon or polyhedron); class (e.g., vehicle versus pedestrian versus bicycle versus other); yaw rate; and/or other state information.

In some implementations, the perception system 103 can determine state data for each object over a number of iterations. In particular, the perception system 103 can update the state data for each object at each iteration. Thus, the perception system 103 can detect and track objects (e.g., vehicles) that are proximate to the autonomous vehicle 10 over time.

The prediction system 104 can receive the state data from the perception system 103 and predict one or more future locations for each object based on such state data. For example, the prediction system 104 can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

The motion planning system 105 can determine a motion plan for the autonomous vehicle 10 based at least in part on the predicted one or more future locations for the object and/or the state data for the object provided by the perception system 103. Stated differently, given information about the current locations of objects and/or predicted future locations of proximate objects, the motion planning system 105 can determine a motion plan for the autonomous vehicle 10 that best navigates the autonomous vehicle 10 relative to the objects at such locations.

As one example, in some implementations, the motion planning system 105 can evaluate a cost function for each of one or more candidate motion plans for the autonomous vehicle 10 based at least in part on the current locations and/or predicted future locations of the objects. For example, the cost function can provide a cost (e.g., over time) of adhering to a particular candidate motion plan. For example, the cost provided by a cost function can increase when the autonomous vehicle 10 strikes another object and/or deviates from a preferred pathway (e.g., a preapproved pathway).

Thus, given information about the current locations and/or predicted future locations of objects, the motion planning system 105 can determine a cost of adhering to a particular candidate pathway. The motion planning system 105 can select or determine a motion plan for the autonomous vehicle 10 based at least in part on the cost function(s). For example, the motion plan that minimizes the cost function can be selected or otherwise determined. The motion planning system 105 can provide the selected motion plan to a vehicle controller 106 that controls one or more vehicle controls 107 (e.g., actuators or other devices that control gas flow, steering, braking, etc.) to execute the selected motion plan.

Each of the perception system 103, the prediction system 104, the motion planning system 105, and the vehicle controller 106 can include computer logic utilized to provide desired functionality. In some implementations, each of the perception system 103, the prediction system 104, the motion planning system 105, and the vehicle controller 106 can be implemented in hardware, firmware, and/or software controlling a general purpose processor. For example, in some implementations, each of the perception system 103, the prediction system 104, the motion planning system 105, and the vehicle controller 106 includes program files stored on a storage device, loaded into a memory and executed by one or more processors. In other implementations, each of the perception system 103, the prediction system 104, the motion planning system 105, and the vehicle controller 106 includes one or more sets of computer-executable instructions that are stored in a tangible computer-readable storage medium such as RAM hard disk or optical or magnetic media.

Example User Interfaces

Figure 4:
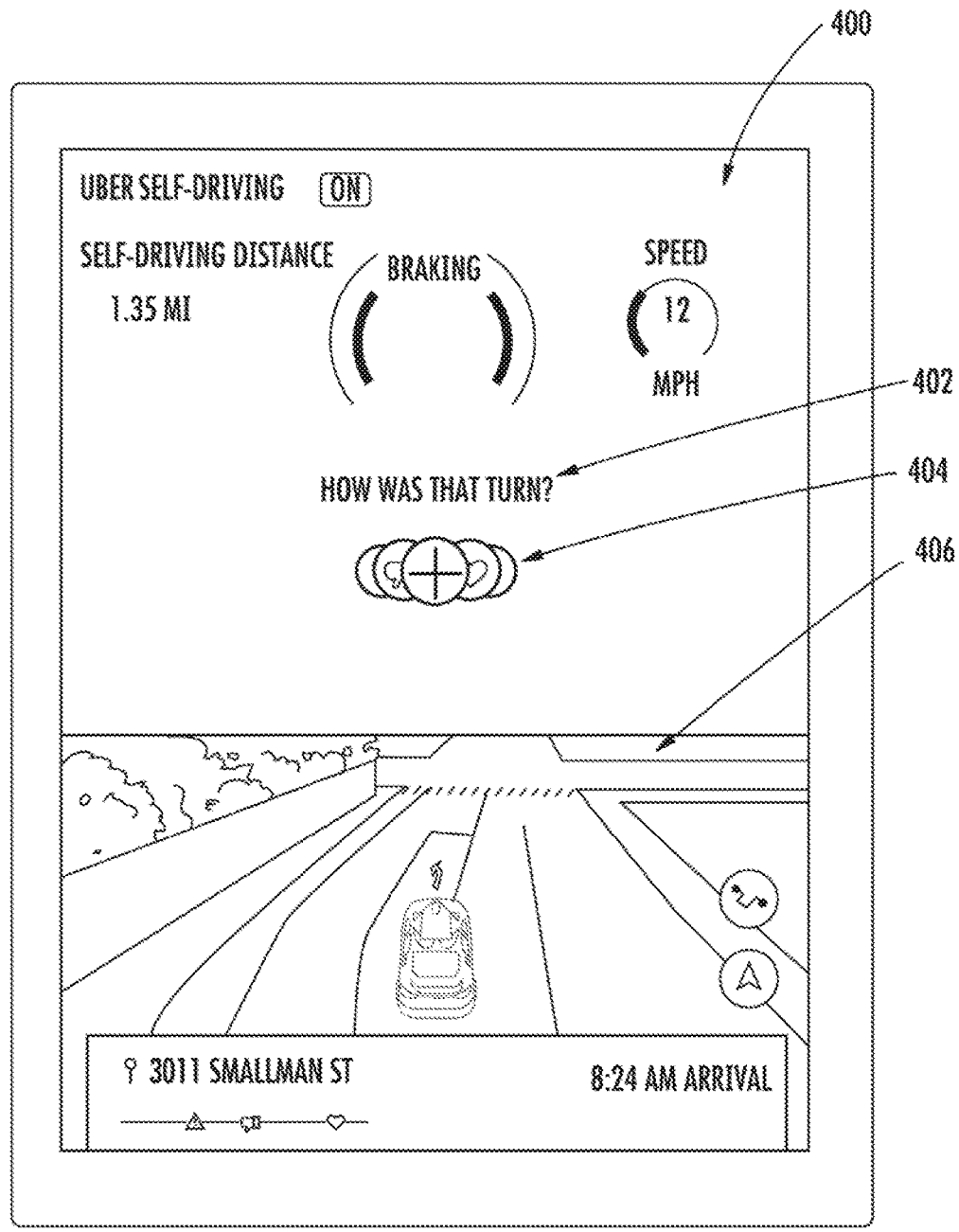
FIG. 4 depicts an example interactive user interface according to example embodiments of the present disclosure.
Figure 5:
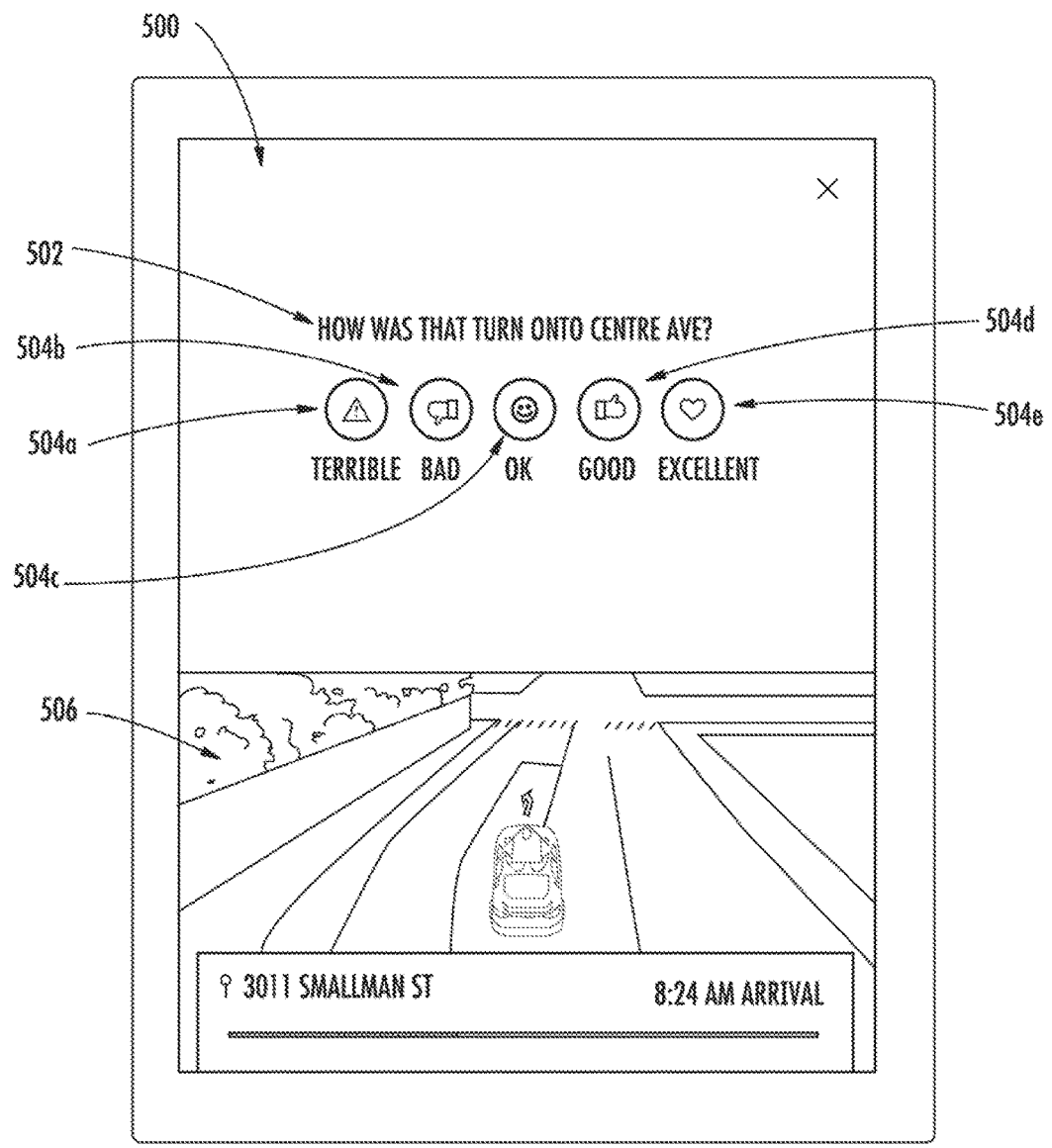
FIG. 5 depicts an example interactive user interface according to example embodiments of the present disclosure.
Figure 6:
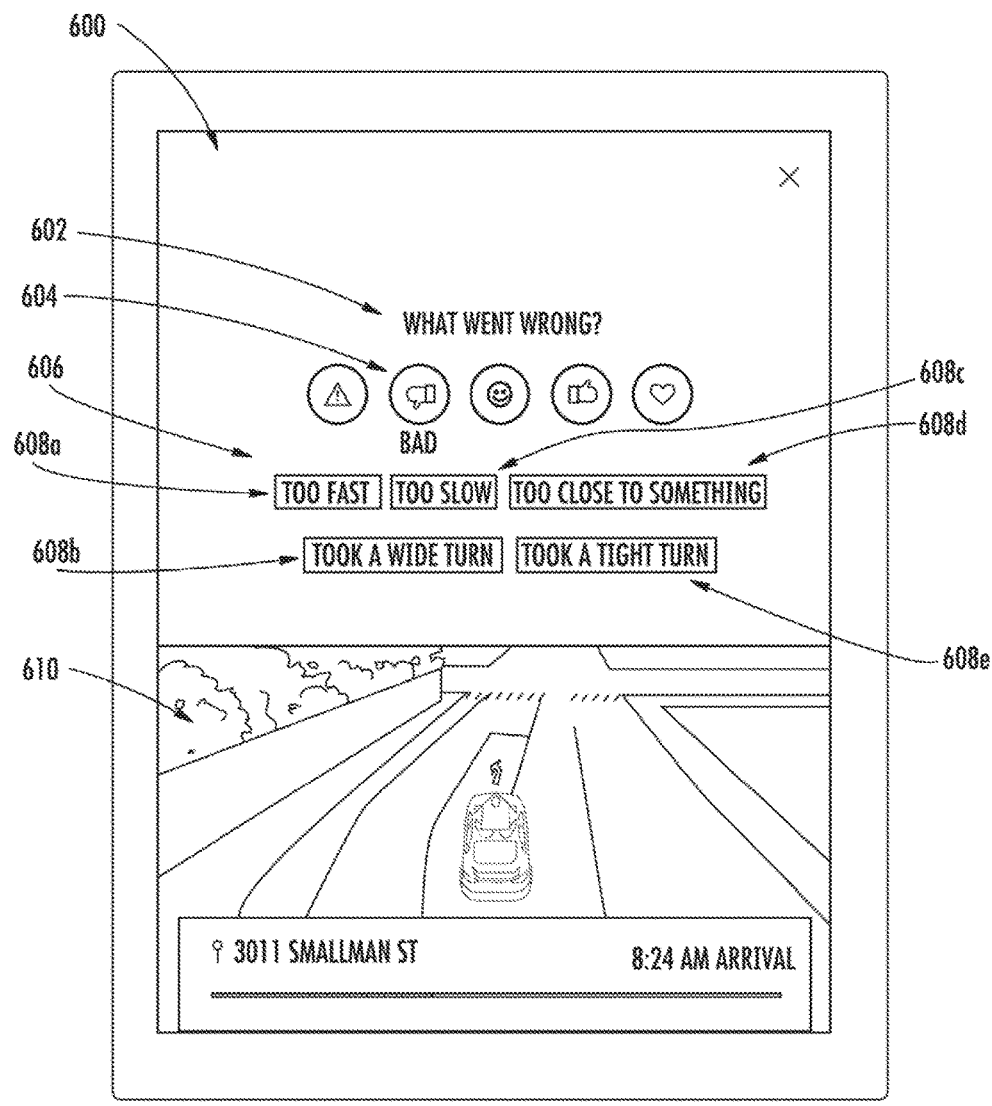
FIG. 6 depicts an example interactive user interface according to example embodiments of the present disclosure.

According to another aspect of the present disclosure, in response to detection of the occurrence of a driving event performed by the autonomous vehicle, the systems of the present disclosure can provide an interactive user interface. The interactive user interface can enable a passenger of the autonomous vehicle to enter passenger feedback regarding the occurrence of the driving event. FIGS. 4-6 depict example user interfaces according to example embodiments of the present disclosure. The user interfaces shown in FIGS. 4-6 are provided as examples only. Different user interfaces with different features, arrangements, or interactivity can be used in addition or alternatively to the user interfaces shown in FIGS. 4-6.

As one example user interface that can be provided in response to detection of a driving event, FIG. 4 depicts an example interactive user interface 400 according to example embodiments of the present disclosure. The user interface 400 includes an initial user-selectable icon 404 that enables the passenger to indicate a desire to provide passenger feedback. For example, the initial user-selectable icon 404 can be a single selectable space that depicts a cluster of buttons or icons, as illustrated in FIG. 4. A plus sign can indicate that selection of the icon 404 will result in presentation of additional feedback options.

A message or header 402 can be provided adjacent to (e.g., above) the user-selectable icon 404. The message 402 can provide a context for the passenger feedback is requested. For example, the message can identify the detected driving event (e.g., a turn).

In addition, in some implementations, the user interface 400 can include a visualization 406 of the autonomous vehicle during performance of the detected driving event. As one example, the visualization 406 can visualize or otherwise be generated based at least in part on light detection and ranging data collected by the autonomous vehicle during performance of the driving event. Providing the visualization 406 of the autonomous vehicle during performance of the detected driving event within the user interface 400 can enable the passenger to visually review the driving event when deciding whether to provide passenger feedback.

In some implementations, the interactive user interface 400 can be specific to and associated with the particular detected driving event. As one example, different user-selectable icons can be provided respectively for different events. As another example, different graphics, identifiers, or messages can be provided within the interactive user interface 400 to help distinguish each event from other events. To provide an example, a textual, map-based, or other visual identifier(s) (e.g., alternatively or in addition to message 402) can identify a "turn onto Center Street" from "a turn onto First Street."

Any other aspects of the user interface 400 (e.g., font, formatting, size, number of icons, type of icons, number of identifiers, type of identifiers, etc.) can be modified to provide interfaces that are specific to respective driving event(s).

In some implementations, after receipt of a user selection of the initial user-selectable icon 404, the user interface can then transition to provide a plurality of user-selectable icons that respectively correspond to a plurality of levels of satisfaction. For example, the cluster of buttons or icons depicted at 404 can visually spread apart and become independently selectable.

As one example, FIG. 5 depicts an example user interface 500 that includes a plurality of user-selectable icons 504*a-e* that respectively correspond to a plurality of levels of satisfaction. In some implementations, the user interface 500 is provided in response to receipt of a user selection of an initial user-selectable icon (e.g., icon 404) that enables the passenger to indicate a desire to provide the passenger feedback. In other implementations, the user interface 500 can be provided directly in response to detection of a driving event (e.g., without providing user interface 400 or otherwise requiring selection of an initial feedback icon).

Referring still to FIG. 5, the passenger can select one of the plurality of user-selectable icons 504*a-e* to provide passenger feedback indicative of the corresponding level of satisfaction. As one example, the user-selectable icons 504*a-e* can correspond to very unsatisfied, unsatisfied, neutral, satisfied, and very satisfied. However, many other divisions or levels of satisfaction can be used instead of these example levels.

A message or header 502 can be provided adjacent to (e.g., above) the icons 504*a-e* to provide a context for the passenger feedback. For example, the message 502 can identify the driving event relative to which passenger feedback is requested (e.g., "How was that turn on Centre Ave?").

In some implementations, the plurality of user-selectable icons 504*a-e* can include graphical and/or textual indicators that assist the passenger in selecting the appropriate icon 504*a-e*. Thus, as illustrated in FIG. 5, textual indicators can be provided that describe the corresponding level of satisfaction. Additionally or alternatively, graphical indicators can be provided that describe the corresponding level of satisfaction, as are also illustrated in FIG. 5.

In some implementations, the plurality of user-selectable icons can be included within a single graphical item (e.g., a plurality of user-selectable notches along an axis or a plurality of user-selectable notches on a dial). In some implementations, rather than discrete levels of satisfaction, a slider, dial, knob or other physical or virtual feature can enable the passenger to provide feedback along a continuous spectrum of satisfaction level.

In addition, in some implementations, the user interface 500 can include a visualization 506 of the autonomous vehicle during performance of the detected driving event. As one example, the visualization 506 can visualize or otherwise be generated based at least in part on light detection and ranging data collected by the autonomous vehicle during performance of the driving event. Providing the visualization 506 of the autonomous vehicle during performance of the detected driving event within the user interface can enable the passenger to visually review the driving event when providing the passenger feedback.

In some implementations, the interactive user interface 500 can be specific to and associated with the particular detected driving event. As one example, different sets of user-selectable icons 504*a-e* can be provided respectively for different events. As another example, different identifiers can be provided within the interactive user interface 500 to help distinguish each event from other events. To provide an example, a textual, map-based, or other visual identifier(s) (e.g., in addition to message 502) can identify a "turn onto Center Street" from "a turn onto First Street."

Any other aspects of the user interface 500 (e.g., font, formatting, size, number of icons, type of icons, number of identifiers, type of identifiers, etc.) can be modified to provide interfaces that are specific to respective driving event(s).

In some implementations, in response to receiving a passenger feedback that selects one of the plurality of user-selectable icons 504*a-e*, the systems of the present disclosure can transition the user interface to subsequently provide a secondary menu that provides a second plurality of user-selectable icons.

As one example, FIG. 6 depicts an example user interface 600 that includes a second plurality of user-selectable icons 608*a-e*. As one example, the second plurality of user-selectable icons 608*a-e* can respectively correspond to a plurality of textual phrases that respectively describe different reasons for the indicated level of satisfaction. In some implementations, the previously selected level of satisfaction can be highlighted as shown at 604. As examples, the textual phrases can include phrases such as "too fast," "too slow," "too close to other vehicles," "turned too wide," etc.

In other implementations, the second plurality of user-selectable icons 608*a-e* are not textual in nature but instead include a graphical depiction of different reasons for the indicated level of satisfaction (e.g., a graphical depiction of a vehicle taking an over-wide turn). Different textual phrases or graphical icons can be used depending on the nature of the detected event, as will be discussed further below.

The user interface 600 can further include a message 602 that provides a context for the icons 608*a-e*. In some implementations, as illustrated in FIG. 6, the first plurality of icons that correspond to levels of satisfaction can remain within the user interface 600 while the second plurality of user-selectable icons 608*a-e* are provided. For example, the selected icon/level of satisfaction can be highlighted as shown at 604. Alternatively, only the selected icon/level of satisfaction 604 may remain while the other icons/levels of satisfaction are removed. In yet further implementations, the first plurality of icons that correspond to levels of satisfaction are removed from the user interface 600 when the second plurality of user-selectable icons 608*a-e* are provided.

In some implementations, the interactive user interface 600 can be specific to and associated with the particular detected driving event. Stated differently, different secondary menu items 608*a-e* can be provided respectively for different events. For example, secondary menu items provided in response to a turning event can include textual phrases specific to turning events (e.g., "turned too wide," "turned too narrow," etc.), while secondary menu items provided in response to a stopping event can include textual phrases specific to stopping events (e.g., "stopped too late," "stopped too early," etc.). Thus, in some implementations, while the first plurality of icons that correspond to levels of satisfaction are consistent across different event types, the second plurality of icons 608*a-e* can be specific to the particular type of event that has been detected (e.g., turning event versus stopping event).

In some implementations, the interactive user interface 600 can be specific to and associated with the particular selected level of satisfaction. Stated differently, different sets of icons 608*a-e* can be provided depending on the level of satisfaction selected by the passenger. For example, the icons 608*a-e* illustrated in FIG. 6 provide respective textual descriptions of what went wrong. Therefore, the icons 608*a-e* illustrated in FIG. 6 can be displayed in response to selection of an icon (e.g., 604) that corresponds to a negative level of satisfaction. However, if the passenger had selected an icon that corresponded to a positive level of satisfaction, the icons 608*a-e* could be different. In particular, in such scenario the icons 608*a-e* could provide respective textual phrases that describe what went right, or with which aspect the passenger felt satisfied.

Different identifiers can be provided within the interactive user interface to help distinguish each event from other events. To provide an example, a textual, map-based, or other visual identifier(s) can identify a "turn onto Center Street" from "a turn onto First Street."

Any other aspects of the user interface 600 (e.g., font, formatting, size, number of icons, type of icons, number of identifiers, type of identifiers, etc.) can be modified to provide interfaces that are specific to respective driving event(s).

In some implementations, the systems of the present disclosure modify the user interface (e.g., transition from interface 500 to interface 600) to provide the second plurality of icons 608*a-e* only when the passenger selects one of the plurality of user-selectable icons 504*a-e* that corresponds to a negative level of satisfaction (or some other defined subset of the icons or types of passenger feedback).

In some implementations, additional levels of hierarchical feedback menus beyond a primary and secondary menu can be used. For example, any number of hierarchies (tertiary menus, quaternary menus, etc.) organized according to different any number of different categories or schemes can be used.

In some implementations, the second plurality of icons 608*a-e* can be provided directly in response to a detected driving event of a certain type. For example, in response to detecting a turn event, textual or graphical descriptions of passenger feedback can be provided without first receiving feedback regarding a level of satisfaction.

In some implementations, the interactive user interface can include a visualization 610 of the autonomous vehicle during performance of the detected driving event. As one example, the visualization 610 can visualize or otherwise be generated based at least in part on light detection and ranging data collected by the autonomous vehicle during performance of the driving event. Providing the visualization 610 of the autonomous vehicle during performance of the detected driving event within the user interface 600 can enable the passenger to visually review the driving event while selecting from among the second plurality of icons 608*a-e*.

In some implementations, one or more of the interactive user interfaces 400, 500, and 600 can request that the passenger provides passenger feedback that identifies the driving event. For example, the feedback collection system may have identified that a driving event occurred but be unable to determine the exact nature of the driving event. Thus, the interactive user interface(s) can request that the passenger provides passenger feedback that identifies the driving event. For example, the user interface(s) can request that the passenger provides passenger feedback that narrows the driving event from a general category (e.g., stopping event) to a specific type (e.g., stopping at stop sign event vs. stopping at crosswalk event vs. stopping at traffic light event vs. stopping due to humanly-guided (e.g., traffic officer) traffic stop event, etc.).

Example Methods

Figure 7:
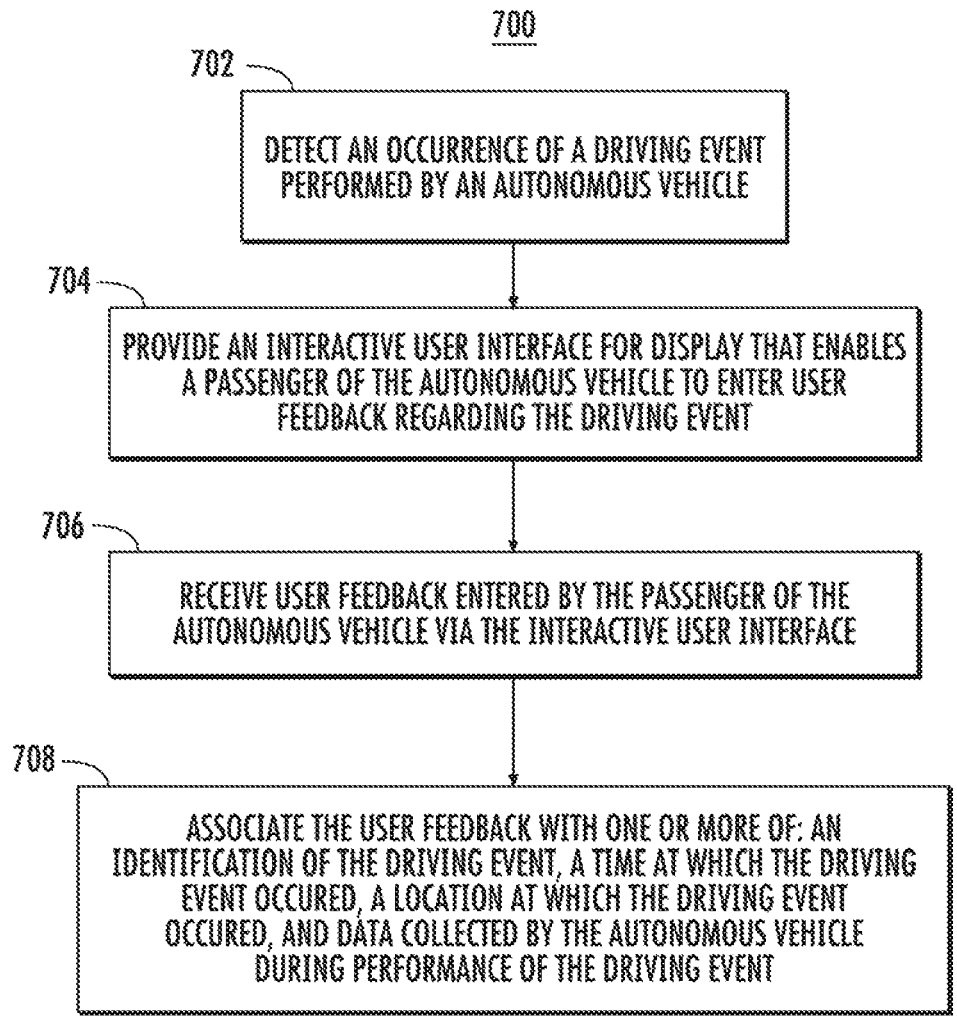
FIG. 7 depicts a flow chart diagram of an example method to obtain autonomous vehicle passenger feedback according to example embodiments of the present disclosure.

FIG. 7 depicts a flow chart diagram of an example method to obtain autonomous vehicle passenger feedback according to example embodiments of the present disclosure.

Although FIG. 7 depicts steps performed in a particular order for purposes of illustration and discussion, the methods of the present disclosure are not limited to the particularly illustrated order or arrangement. The various steps of method 700 can be omitted, rearranged, combined, and/or adapted in various ways without deviating from the scope of the present disclosure.

At 702, a computing system detects an occurrence of a driving event performed by an autonomous vehicle. For example, the computing system can include one or more computing devices that are on-board the autonomous vehicle.

In some implementations, the computing system can detect the occurrence of the driving event at 702 based at least in part on one or more of: turn-by-turn data associated with a navigational system included in the autonomous vehicle; vehicle data collected by the autonomous vehicle; telematics data generated by the autonomous vehicle; data collected by a human machine interface computing device that describes motion experienced by the passenger; and data wirelessly received from a user device associated with the passenger that describes motion experienced by the passenger.

In some implementations, detecting the occurrence of the driving event at 702 can include detecting the occurrence of one or more of: a turn event; a lane change event; a stopping event; a hard brake event; a weaving event; a juking event; a jerking event; an excessive speed event; an insufficient speed event; and an excessive acceleration event.

At 704, the computing system provides an interactive user interface for display that enables a passenger of the autonomous vehicle to enter user feedback regarding the driving event. For example, the interactive user interface can be provided on a rear-seat display that is accessible to a passenger located in a rear seat of the autonomous vehicle.

In some implementations, providing the interactive user interface at 704 can include providing an interactive user interface that provides a plurality of user-selectable icons that respectively correspond to a plurality of levels of satisfaction. Each user-selectable icon can be selectable by the passenger to provide the passenger feedback indicative of the corresponding level of satisfaction.

In some implementations, providing the user interface at 704 can include providing a user interface that includes a visualization of the autonomous vehicle performing the driving event.

In some implementations, providing the user interface at 704 can include providing a user interface that is specific to and associated with the particular detected driving event.

In some implementations, providing the user interface at 704 can include providing a user interface that requests that the passenger provide passenger feedback that identifies the driving event.

At 706, the computing system receives user feedback entered by the passenger of the autonomous vehicle via the interactive user interface. For example, the feedback can include a user selection of one of the user-selectable icons that respectively correspond to a plurality of levels of satisfaction.

At 708, the computing system associates the user feedback with one or more of: an identification of the driving event, a time at which the driving event occurred, a location at which the driving event occurred, and data collected by the autonomous vehicle during performance of the driving event. In some implementations, associating the passenger feedback with one or more of such items at 708 can include storing the passenger feedback in a database or other data representation where it is relationally associated with such one or more items.

In some implementations, providing the interactive user interface at 704 and receiving the passenger feedback at 706 can include providing an interactive user interface that initially includes an initial user-selectable icon that enables the passenger to indicate a desire to provide the passenger feedback; receiving a user selection of the initial user-selectable icon; and, in response to the user selection of the initial user-selectable icon, providing the interactive user interface that provides the plurality of user-selectable icons that respectively correspond to the plurality of levels of satisfaction.

In some implementations, providing the interactive user interface at 704 and receiving the passenger feedback at 706 can include receiving the passenger feedback that selects one of the plurality of user-selectable icons and, in response, providing a secondary menu that provides a second plurality of user-selectable icons that respectively correspond to a plurality of textual phrases that respectively describe different reasons for the indicated level of satisfaction. Further at 706, the computing system can receive a user selection of one or more of the second plurality of user-selectable icons and, at 708, can associate such selection with one or more of: the identification of the driving event, the time at which the driving event occurred, the location at which the driving event occurred, and data collected by the autonomous vehicle during performance of the driving event.

In yet another example method of the present disclosure, a computing system can detect that a particular passenger of an autonomous vehicle is visiting a location at which the passenger previously provided passenger feedback or that the particular passenger is being subjected to a driving event for which the passenger previously provided passenger feedback. In response, the computing system can request that the passenger provides new passenger feedback. Receipt of additional passenger feedback can enable the computing system to evaluate whether any improvement in autonomous vehicle performance has been achieved in the time period between respective passenger feedbacks, as indicated by a change in the feedback.

Another example method of the present disclosure can include aggregating, by the computing system, multiple instances of feedback data received via the interactive user interface relative to multiple detected driving events over time. The method can further include determining, by the computing system, an aggregate performance score for at least the autonomous vehicle relative to at least one physical location based at least in part on the aggregated multiple instances of feedback data. For example, the aggregate performance score for the location can be an average or other statistical measures of all feedback received for such location.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method to obtain autonomous vehicle passenger feedback, the method comprising:
    detecting, by a computing system comprising one or more computing devices, an occurrence of a driving event performed by an autonomous vehicle, wherein detecting, by the computing system, the occurrence of the driving event performed by the autonomous vehicle comprises detecting, by the computing system, the occurrence of the driving event based at least in part on one or more of:
        turn-by-turn data associated with a navigational system included in the autonomous vehicle;
        vehicle data collected by the autonomous vehicle;
        telematics data generated by the autonomous vehicle;
        data collected by a human machine interface computing device that describes motion experienced by the passenger; and
        data wirelessly received from a user device associated with the passenger that describes motion experienced by the passenger;
    in response to detecting the occurrence of the driving event; providing, by the computing system, an interactive user interface that enables a passenger of the autonomous vehicle to enter passenger feedback regarding the occurrence of the driving event performed by the autonomous vehicle;
    receiving, by the computing system, the passenger feedback entered by the passenger of the autonomous vehicle via the interactive user interface; and
    associating, by the computing system, the passenger feedback with one or more of: an identification of the driving event performed by the autonomous vehicle, a time at which the driving event occurred, a location at which the driving event occurred, and data collected by the autonomous vehicle during performance of the driving event.

2. The computer-implemented method of claim 1, wherein the one or more computing devices are on-board the autonomous vehicle.

3. The computer-implemented method of claim 1, wherein detecting, by the computing system, the occurrence of the driving event performed by the autonomous vehicle comprises detecting, by the computing system, the occurrence of one or more of:
    a turn event;
    a lane change event;
    a stopping event;
    a hard brake event;
    a weaving event;
    a juking event;
    a jerking event;
    an excessive speed event;
    an insufficient speed event; and
    an excessive acceleration event.

4. The computer-implemented method of claim 1, wherein providing, by the computing system, the interactive user interface comprises displaying the interactive user interface on a rear-seat display device that is accessible by the passenger that is located in a rear seat of the autonomous vehicle.

5. The computer-implemented method of claim 1, wherein providing, by the computing system, the interactive user interface comprises providing, by the computing system, the interactive user interface that provides a plurality of user-selectable icons that respectively correspond to a plurality of levels of satisfaction; each user-selectable icon selectable by the passenger to provide the passenger feedback indicative of the corresponding level of satisfaction.

6. The computer-implemented method of claim 5, wherein providing, by the computing system, the interactive user interface comprises:
    providing for display, by the computing system, the interactive user interface that initially includes an initial user-selectable icon that enables the passenger to indicate a desire to provide the passenger feedback; and
    receiving, by the computing system, a user selection of the initial user-selectable icon; and
    in response to receiving the user selection of the initial user-selectable icon; providing for display, by the computing system, the interactive user interface that provides the plurality of user-selectable icons that respectively correspond to the plurality of levels of satisfaction.

7. The computer-implemented method of claim 5, further comprising:
    in response to receiving the passenger feedback that selects one of the plurality of user-selectable icons, causing, by the computing system, the user interface to provide a secondary menu that provides a second plurality of user-selectable icons that respectively correspond to a plurality of textual phrases that respectively describe different reasons for the indicated level of satisfaction.

8. The computer-implemented method of claim 7, wherein causing, by the computing system, the user interface to provide the secondary menu in response to receiving the passenger feedback that selects one of the plurality of user-selectable icons comprises causing, by the computing system, the user interface to provide the secondary menu in response to receiving the passenger feedback that selects one of the plurality of user-selectable icons that corresponds to a negative level of satisfaction.

9. The computer-implemented method of claim 1, wherein providing, by the computing system, the interactive user interface comprises providing for display, by the computing system, the interactive user interface that includes a visualization of the autonomous vehicle performing the driving event.

10. The computer-implemented method of claim 9, wherein providing for display, by the computing system, the interactive user interface that includes the visualization of the autonomous vehicle performing the driving event comprises providing for display, by the computing system, the interactive user interface that includes the visualization that visualizes light detection and ranging data collected by the autonomous vehicle during performance of the driving event.

11. The computer-implemented method of claim 1, wherein providing, by the computing system, the interactive user interface comprises providing, by the computing system, the interactive user interface that is specific to and associated with the particular detected driving event, the interactive user interface that is specific to and associated with the particular detected driving event different from at least one alternative user interface that is specific to and associated with at least one alternative driving event.

12. The computer-implemented method of claim 1, wherein providing, by the computing system, the interactive user interface comprises providing, by the computing system, the interactive user interface that requests that the passenger provides the passenger feedback that identifies the driving event.

13. The computer-implemented method of claim 1, wherein providing, by the computing system, the interactive user interface comprises providing, by the computing system, the interactive user interface that requests that the passenger provides the passenger feedback relative to multiple overlapping driving events.

14. The computer-implemented method of claim 1, further comprising:
aggregating, by the computing system, multiple instances of feedback data received via the interactive user interface relative to multiple detected driving events over time; and
determining, by the computing system, an aggregate performance score for at least the autonomous vehicle relative to at least one physical location based at least in part on the aggregated multiple instances of feedback data.

15. A computing system, comprising:
one or more processors; and
one or more non-transitory computer-readable media that collectively store instructions that; when executed by the one or more processors, cause the computing system to perform operations, the operations comprising:
detecting an occurrence of a driving event performed by an autonomous vehicle, wherein detecting the occurrence of the driving event performed by the autonomous vehicle comprises detecting the occurrence of the driving event based at least in part on one or more of:
turn-by-turn data associated with a navigational system included in the autonomous vehicle;
vehicle data collected by the autonomous vehicle;
telematics data generated by the autonomous vehicle;
data collected by a human machine interface computing device that describes motion experienced by the passenger; and
data wirelessly received from a user device associated with passenger that describes motion experienced b the passenger;
in response to detecting the occurrence of the driving event, providing an interactive user interface that enables a passenger of the autonomous vehicle to enter passenger feedback regarding the occurrence of the driving event performed by the autonomous vehicle;
receiving the passenger feedback entered by the passenger of the autonomous vehicle via the interactive user interface; and
associating the passenger feedback with one or more of: an identification of the driving event performed by the autonomous vehicle, a time at which the driving event occurred, a location at which the driving event occurred, and data collected by the autonomous vehicle during performance of the driving event.

16. The computing system of claim 15, further comprising:
a rear-seat display device that is accessible by the passenger that is located in a rear seat of the autonomous vehicle;
wherein providing the interactive user interface comprises displaying the interactive user interface on the rear-seat display.

17. The computing system of claim 15, wherein providing the interactive user interface comprises providing the interactive user interface to a user computing device associated with the passenger for display by the user computing device.

18. The computing system of claim 15, wherein the computing system comprises an autonomy system and a human machine interface device, wherein one or both of the autonomy system and the human machine interface device perform the operation of detecting the occurrence of the driving event performed by the autonomous vehicle.

19. One or more non-transitory computer-readable media that collectively store instructions that, when executed by one or more processors, cause a computing system to perform operations, the operations comprising:
detecting an occurrence of a driving event performed by an autonomous vehicle, wherein detecting the occurrence of the driving event performed by the autonomous vehicle comprises detecting the occurrence of the driving event based at least in part on one or more of:
turn-by-turn data associated with a navigational system included in the autonomous vehicle;
vehicle data collected by the autonomous vehicle;
telematics data generated by the autonomous vehicle;
data collected by a human machine interface computing device that describes motion experienced by the passenger; and
data wirelessly received from a user device associated with the passenger that describes motion experienced by the passenger;
in response to detecting the occurrence of the driving event, providing an interactive user interface that enables a passenger of the autonomous vehicle to enter passenger feedback regarding the occurrence of the driving event performed by the autonomous vehicle;
receiving the passenger feedback entered by the passenger of the autonomous vehicle via the interactive user interface; and
associating the passenger feedback with one or more of: an identification of the driving event performed by the autonomous vehicle, a time at which the driving event occurred, a location at which the driving event occurred, and data collected by the autonomous vehicle during performance of the driving event.

20. A computer-implemented method to obtain autonomous vehicle passenger feedback, the method comprising:
    detecting, by a computing system comprising one or more computing devices, an occurrence of a driving event performed by an autonomous vehicle;
    in response to detecting the occurrence of the driving event, providing, by the computing system, an interactive user interface that enables a passenger of the autonomous vehicle to enter passenger feedback regarding the occurrence of the driving event performed by the autonomous vehicle, wherein providing, by the computing system, the interactive user interface comprises:
        providing for display, by the computing system, the interactive user interface that initially includes an initial user-selectable icon that enables the passenger to indicate a desire to provide the passenger feedback;
        receiving, by the computing system, a user selection of the initial user-selectable icon; and
        in response to receiving the user selection of the initial user-selectable icon, providing for display, by the computing system, the interactive user interface that provides a plurality of user-selectable icons that respectively correspond to a plurality of levels of satisfaction, each user-selectable icon selectable by the passenger to provide the passenger feedback indicative of the corresponding level of satisfaction;
    receiving, by the computing system, the passenger feedback entered by the passenger of the autonomous vehicle via the interactive user interface; and
    associating, by the computing system, the passenger feedback with one or more of: an identification of the driving event performed by the autonomous vehicle, a time at which the driving event occurred, a location at which the driving event occurred, and data collected by the autonomous vehicle during performance of the driving event.

21. A computer-implemented method to obtain autonomous vehicle passenger feedback, the method comprising:
    detecting, by a computing system comprising one or more computing devices, an occurrence of a driving event performed by an autonomous vehicle;
    in response to detecting the occurrence of the driving event, providing, by the computing system, an interactive user interface that enables a passenger of the autonomous vehicle to enter passenger feedback regarding the occurrence of the driving event performed by the autonomous vehicle, wherein providing, by the computing system, the interactive user interface comprises providing; by the computing system, the interactive user interface that provides a plurality of user-selectable icons that respectively correspond to a plurality of levels of satisfaction, each user-selectable icon selectable by the passenger to provide the passenger feedback indicative of the corresponding level of satisfaction;
    receiving, by the computing system, the passenger feedback entered by the passenger of the autonomous vehicle via the interactive user interface, wherein the passenger feedback selects one of the plurality of user-selectable icons;
    in response to receiving the passenger feedback that selects one of the plurality of user-selectable icons, causing, by the computing system, the user interface to provide a secondary menu that provides a second plurality of user-selectable icons that respectively correspond to a plurality of textual phrases that respectively describe different reasons for the indicated level of satisfaction; and
    associating, by the computing system, the passenger feedback with one or more of: an identification of the driving event performed by the autonomous vehicle, a time at which the driving event occurred, a location at which the driving event occurred, and data collected by the autonomous vehicle during performance of the driving event.

22. The computer-implemented method of claim 21, wherein causing, by the computing system, the user interface to provide the secondary menu in response to receiving the passenger feedback that selects one of the plurality of user-selectable icons comprises causing, by the computing system, the user interface to provide the secondary menu in response to receiving the passenger feedback that selects one of the plurality of user-selectable icons that corresponds to a negative level of satisfaction.

23. A computer-implemented method to obtain autonomous vehicle passenger feedback, the method comprising:
    detecting, by a computing system comprising one or more computing devices, an occurrence of a driving event performed by an autonomous vehicle;
    in response to detecting the occurrence of the driving event, providing, by the computing system, an interactive user interface that enables a passenger of the autonomous vehicle to enter passenger feedback regarding the occurrence of the driving event performed by the autonomous vehicle, wherein providing, by the computing system, the interactive user interface comprises providing for display, by the computing system, the interactive user interface that includes a visualization of the autonomous vehicle performing the driving event, and wherein providing for display, by the computing system, the interactive user interface that includes the visualization of the autonomous vehicle performing the driving event comprises providing for display, by the computing system, the interactive user interface that includes the visualization that visualizes light detection and ranging data collected by the autonomous vehicle during performance of the driving event;
    receiving, by the computing system; the passenger feedback entered by the passenger of the autonomous vehicle via the interactive user interface; and
    associating, by the computing system, the passenger feedback with one or more of: an identification of the driving event performed by the autonomous vehicle; a time at which the driving event occurred, a location at which the driving event occurred, and data collected by the autonomous vehicle during performance of the driving event.

24. A computer-implemented method to obtain autonomous vehicle passenger feedback, the method comprising:
    detecting, by a computing system comprising one or more computing devices, an occurrence of a driving event performed by an autonomous vehicle;
    in response to detecting the occurrence of the driving event, providing, by the computing system, an interactive user interface that enables a passenger of the autonomous vehicle to enter passenger feedback regarding the occurrence of the driving event performed by the autonomous vehicle, wherein providing, by the computing system, the interactive user interface comprises providing, by the computing system, the interactive user interface that is specific to and associated with the particular detected driving event, the interactive user interface that is specific to and associated with the particular detected driving event different from at least one alternative user interface that is specific to and associated with at least one alternative driving event;

receiving, by the computing system, the passenger feedback entered by the passenger of the autonomous vehicle via the interactive user interface; and associating, by the computing system, the passenger feedback with one or more of: an identification of the driving event performed by the autonomous vehicle, a time at which the driving event occurred, a location at which the driving event occurred; and data collected by the autonomous vehicle during performance of the driving event.

\* \* \* \* \*